United States Patent
Rogers et al.

(10) Patent No.: US 10,941,258 B2
(45) Date of Patent: Mar. 9, 2021

(54) METAL PARTICLE-CHITIN COMPOSITE MATERIALS AND METHODS OF MAKING THEREOF

(71) Applicants: THE BOARD OF TRUSTEES OF THE UNIVERSITY OF ALABAMA, Tuscaloosa, AL (US); 525 Solutions, Inc., Tuscaloosa, AL (US)

(72) Inventors: Robin D. Rogers, Tuscaloosa, AL (US); Oleksandra Zavgorodnya, Tuscaloosa, AL (US); Julia L. Shamshina, Tuscaloosa, AL (US)

(73) Assignees: THE BOARD OF TRUSTEES OF THE UNIVERSITY OF ALABAMA, Tuscaloosa, AL (US); 525 Solutions, Inc., Tuscaloosa, AL (US)

(*) Notice: Subject to any disclaimer, the term of this patent is extended or adjusted under 35 U.S.C. 154(b) by 222 days.

(21) Appl. No.: 15/933,700

(22) Filed: Mar. 23, 2018

(65) Prior Publication Data
US 2018/0273710 A1 Sep. 27, 2018

Related U.S. Application Data

(60) Provisional application No. 62/476,019, filed on Mar. 24, 2017.

(51) Int. Cl.
  *C08J 5/12* (2006.01)
  *C08K 3/11* (2018.01)
  (Continued)

(52) U.S. Cl.
  CPC ............... *C08J 5/122* (2013.01); *C07B 37/04* (2013.01); *C08B 37/003* (2013.01); *C08K 3/08* (2013.01);
  (Continued)

(58) Field of Classification Search
  CPC .......... C08L 5/08; D01D 5/0046; C08J 11/02; D01F 1/02; D01F 1/10; D01F 1/103
  See application file for complete search history.

(56) References Cited

U.S. PATENT DOCUMENTS

| | | |
|---|---|---|
| 1,943,176 A | 1/1934 | Graenacher |
| 3,892,731 A | 7/1975 | Austin |
| | (Continued) | |

FOREIGN PATENT DOCUMENTS

| | | |
|---|---|---|
| CA | 2479941 | 10/2003 |
| CH | 153446 | 6/1932 |
| | (Continued) | |

OTHER PUBLICATIONS

Leon et al, Synthesis and Characterizations of Metallic Nanoparticles in Chitosan by Chemical Reduction, J. Chil. Chem. Soc., 62, N° 4 (2017) (Year: 2017).*

(Continued)

*Primary Examiner* — Hoa (Holly) Le
(74) *Attorney, Agent, or Firm* — Meunier Carlin & Curfman LLC

(57) ABSTRACT

Methods for making metal particle-chitin composite materials are described. The methods can comprise contacting an ionic liquid with chitin, thereby forming a mixture; contacting the mixture with a non-solvent, thereby forming a chitin substrate in the non-solvent; collecting the chitin substrate from the non-solvent; deacetylating the collected chitin substrate, thereby forming a deacetylated chitin substrate; contacting the deacetylated chitin substrate with a metal salt, thereby forming an impregnated precursor composite material; and contacting the impregnated precursor composite material with a reducing agent, thereby reducing the metal (Continued)

salt to form a plurality of metal particles dispersed on the chitin substrate and forming the metal particle-chitin composite material.

20 Claims, 11 Drawing Sheets

(51) Int. Cl.

| | | |
|---|---|---|
| C08K 3/105 | (2018.01) | |
| C07B 37/04 | (2006.01) | |
| C08K 5/3445 | (2006.01) | |
| C08K 5/47 | (2006.01) | |
| C08K 5/3472 | (2006.01) | |
| C08L 5/08 | (2006.01) | |
| C08B 37/08 | (2006.01) | |
| C08K 3/08 | (2006.01) | |

(52) U.S. Cl.
CPC ............... *C08K 3/105* (2018.01); *C08K 3/11* (2018.01); *C08K 5/3445* (2013.01); *C08K 5/3472* (2013.01); *C08K 5/47* (2013.01); *C08L 5/08* (2013.01); *C08K 2003/085* (2013.01); *C08K 2003/0831* (2013.01); *C08K 2003/0856* (2013.01); *C08K 2003/0862* (2013.01); *C08K 2201/005* (2013.01); *C08K 2201/011* (2013.01)

(56) References Cited

U.S. PATENT DOCUMENTS

| | | | |
|---|---|---|---|
| 4,063,017 | A | 12/1977 | Tsao et al. |
| 4,097,666 | A | 6/1978 | Johnson et al. |
| 4,188,263 | A | 2/1980 | Hulsmann et al. |
| 4,274,980 | A | 6/1981 | Arena |
| 4,520,105 | A | 5/1985 | Sinner et al. |
| 4,522,934 | A | 6/1985 | Shum et al. |
| 4,970,156 | A | 11/1990 | Avrameas et al. |
| 5,077,414 | A | 12/1991 | Arduengo et al. |
| 5,376,450 | A | 12/1994 | Greinke et al. |
| 5,679,146 | A | 10/1997 | Kalt et al. |
| 5,683,832 | A | 11/1997 | Bonhote et al. |
| 5,714,536 | A | 2/1998 | Ziolo et al. |
| 5,747,125 | A | 5/1998 | Markulin et al. |
| 5,792,399 | A | 8/1998 | Meister et al. |
| 5,827,602 | A | 10/1998 | Koch et al. |
| 5,836,910 | A | 11/1998 | Duffy et al. |
| 5,836,970 | A | 11/1998 | Pandit et al. |
| 5,856,513 | A | 1/1999 | Ue et al. |
| 6,124,273 | A | 9/2000 | Drohan et al. |
| 6,376,712 | B2 | 4/2002 | Narizuka et al. |
| 6,451,220 | B1 | 9/2002 | Ziolo et al. |
| 6,515,075 | B1 | 2/2003 | Topolkaraev et al. |
| 6,613,310 | B1 | 9/2003 | Campbell et al. |
| 6,808,557 | B2 | 10/2004 | Holbrey et al. |
| 6,824,599 | B2 | 11/2004 | Swatloski et al. |
| 6,846,924 | B1 | 1/2005 | Malmgren et al. |
| 6,939,974 | B2 | 9/2005 | Earle et al. |
| 7,198,026 | B2 | 4/2007 | Masuta et al. |
| 7,198,695 | B2 | 4/2007 | Kettenbach et al. |
| 7,253,289 | B2 | 8/2007 | Ren et al. |
| 7,550,520 | B2 | 6/2009 | Daly et al. |
| 8,030,030 | B2 | 10/2011 | Paripati et al. |
| 8,038,840 | B2 | 10/2011 | Li et al. |
| 8,044,120 | B2 | 10/2011 | D'Andola et al. |
| 8,110,667 | B2 | 2/2012 | Zhang et al. |
| 8,182,557 | B2 | 5/2012 | Argyropoulos |
| 8,986,501 | B2 | 3/2015 | Li et al. |
| 9,096,743 | B2 | 8/2015 | Rogers et al. |
| 9,221,757 | B2 | 12/2015 | Sanford et al. |
| 9,683,309 | B2 * | 6/2017 | Swatloski ............... D01F 9/00 |
| 2001/0024716 | A1 | 9/2001 | Chen et al. |
| 2002/0010291 | A1 | 1/2002 | Murphy |
| 2002/0056633 | A1 | 5/2002 | Westman et al. |
| 2003/0059604 | A1 | 3/2003 | Hattori et al. |
| 2003/0157351 | A1 | 8/2003 | Swatloski et al. |
| 2003/0165445 | A1 | 9/2003 | Malnou et al. |
| 2003/0233742 | A1 | 12/2003 | Jones et al. |
| 2004/0038031 | A1 | 2/2004 | Holbrey et al. |
| 2004/0077519 | A1 | 4/2004 | Price et al. |
| 2005/0058694 | A1 | 3/2005 | Nielsen |
| 2005/0061457 | A1 | 3/2005 | Skuratowicz et al. |
| 2005/0123851 | A1 | 6/2005 | Shinbori et al. |
| 2005/0156144 | A1 | 7/2005 | Fukushima |
| 2005/0194561 | A1 | 9/2005 | Davis |
| 2005/0196671 | A1 | 9/2005 | Paonessa et al. |
| 2005/0285073 | A1 | 12/2005 | Singh et al. |
| 2005/0288484 | A1 | 12/2005 | Holbrey et al. |
| 2006/0118755 | A1 | 6/2006 | Fujioka et al. |
| 2006/0128996 | A1 | 6/2006 | Vaultier et al. |
| 2006/0194197 | A1 | 8/2006 | Spangler et al. |
| 2006/0231792 | A1 | 10/2006 | Drzal |
| 2006/0241287 | A1 | 10/2006 | Hecht et al. |
| 2006/0257645 | A1 | 11/2006 | Asaka et al. |
| 2007/0006774 | A1 | 1/2007 | Rogers et al. |
| 2007/0093462 | A1 | 4/2007 | Rogers et al. |
| 2007/0112185 | A1 | 5/2007 | Myllymaki et al. |
| 2007/0215300 | A1 | 9/2007 | Upfal et al. |
| 2007/0225191 | A1 | 9/2007 | Scheibel et al. |
| 2007/0265379 | A1 | 11/2007 | Chen et al. |
| 2008/0023162 | A1 | 1/2008 | Myllymaki et al. |
| 2008/0097001 | A1 | 4/2008 | Miraftab et al. |
| 2008/0190013 | A1 | 8/2008 | Argyropoulos |
| 2008/0227162 | A1 | 9/2008 | Varanasi et al. |
| 2008/0241536 | A1 | 10/2008 | Luo et al. |
| 2009/0010983 | A1 | 1/2009 | Melvik et al. |
| 2009/0088564 | A1 | 4/2009 | Luo et al. |
| 2009/0099353 | A1 | 4/2009 | Miraftab et al. |
| 2009/0189125 | A1 | 7/2009 | Grigorian et al. |
| 2009/0215720 | A1 | 8/2009 | Thibodeau et al. |
| 2009/0221813 | A1 | 9/2009 | Moellmann et al. |
| 2010/0081798 | A1 | 4/2010 | Balensiefer et al. |
| 2010/0087369 | A1 | 4/2010 | Cutsem et al. |
| 2010/0112646 | A1 | 5/2010 | Balensiefer et al. |
| 2010/0143435 | A1 | 6/2010 | Dagger et al. |
| 2010/0170504 | A1 | 7/2010 | Zhang et al. |
| 2010/0196967 | A1 | 8/2010 | Edye et al. |
| 2010/0239673 | A1 | 9/2010 | Linhardt et al. |
| 2010/0249432 | A1 | 9/2010 | Siemer et al. |
| 2010/0287826 | A1 | 11/2010 | Hoffman et al. |
| 2010/0319862 | A1 | 12/2010 | Rahman et al. |
| 2011/0014550 | A1 | 1/2011 | Jiang et al. |
| 2011/0180951 | A1 | 7/2011 | Teo et al. |
| 2011/0319554 | A1 | 12/2011 | Frazier et al. |
| 2012/0115729 | A1 | 5/2012 | Qin et al. |
| 2012/0216705 | A1 | 8/2012 | Rogers et al. |
| 2012/0245336 | A1 | 9/2012 | Daly et al. |
| 2013/0281745 | A1 | 10/2013 | Brizios |
| 2014/0027938 | A1 * | 1/2014 | Swatloski ............... D01D 5/003 264/10 |
| 2014/0377808 | A1 | 12/2014 | Liu |
| 2015/0239742 | A1 | 8/2015 | Frazier et al. |
| 2015/0297411 | A1 * | 10/2015 | Wang ..................... A61L 15/28 53/425 |
| 2016/0060363 | A1 | 3/2016 | Barber et al. |
| 2018/0273710 | A1 | 9/2018 | Rogers et al. |

FOREIGN PATENT DOCUMENTS

| | | | |
|---|---|---|---|
| CN | | 1380110 | 11/2002 |
| CN | | 103705969 A | * 4/2014 |
| CN | | 106076412 A | 11/2016 |
| DE | | 2703703 | 1/1977 |
| DE | | 934308410 | 9/1994 |
| EP | | 0780391 | 6/1997 |
| EP | | 1222918 | 7/2002 |
| EP | | 904433 B1 | 10/2002 |
| EP | | 1854786 | 11/2007 |
| JP | | 58183601 | 10/1983 |
| JP | | 63056501 | 3/1988 |
| JP | | 64017649 | 1/1989 |
| JP | | 80089796 | 4/1996 |
| JP | | 10265674 | 10/1998 |

(56) References Cited

FOREIGN PATENT DOCUMENTS

| | | |
|---|---|---|
| JP | 2000314035 A | 11/2000 |
| JP | 2002290011 | 10/2002 |
| JP | 2003171144 | 6/2003 |
| JP | 2003335887 | 11/2003 |
| WO | 1994020521 | 9/1994 |
| WO | 1995021871 | 8/1995 |
| WO | 1996006593 | 3/1996 |
| WO | 2000032658 | 6/2000 |
| WO | 2001081436 | 11/2001 |
| WO | 2002079269 | 10/2002 |
| WO | 2002100360 | 12/2002 |
| WO | 2002102586 | 12/2002 |
| WO | 2003029329 | 4/2003 |
| WO | 2003041692 | 5/2003 |
| WO | 2003074031 | 9/2003 |
| WO | 2004027897 | 4/2004 |
| WO | 2005017252 | 2/2005 |
| WO | 2006097571 A1 | 9/2006 |
| WO | 2006116126 A2 | 11/2006 |
| WO | 2007005388 | 1/2007 |
| WO | 2007063327 | 6/2007 |
| WO | 2007111605 A1 | 10/2007 |
| WO | 2009105236 | 8/2009 |
| WO | WO-2010010122 A1 * 1/2010 ........... C08B 37/003 |  |
| WO | 2010056790 | 5/2010 |
| WO | 2010141470 A2 | 12/2010 |
| WO | 2011056924 A1 | 5/2011 |
| WO | 2013158113 | 10/2013 |
| WO | 2014001856 A1 | 1/2014 |

OTHER PUBLICATIONS

Anthony et al., Synthesis, spectrochemical characterisation and catalytic activity of transitionmetal complexes derived from Schiff base modified chitosan, Spectrochimica Acta Part A: Molecular and Biomolecular Spectroscopy 103 (2013) 423-430. (Year: 2013).*
Zain et al., Green synthesis of silver and copper nanoparticles using ascorbic acidand chitosan for antimicrobial applications, Carbohydrate Polymers 112 (2014) 195-202. (Year: 2014).*
Pillai and Sharma, Electrospinning of Chitin and Chitosan Nanofibres, Division of Biosurface Technology, Biomedical Technology Wing,Sree Chitra Thirunal Institute for Medical Sciences & Technology,Poojappura, Thiruvananthapuram 695 012 India, Mar. 17, 2009 (Year: 2009).*
Rieger, Biopolymer Electrospun Nanofiber Mats to Inactivate and Remove Bacteria, Doctoral Thesis (Year: 2016).*
Leon et al., Synthesis and Characterizations of Metallic Nanoparticles in Chitosan by Chemical Reduction, J. Chil. Chem. Soc. vol. 62 No. 4 Concepción dic. 2017 http://dx.doi.org/10.4067/s0717-9707017000403760 (Year: 2017).*
"Official Methods of Analysis of the Association of Official Analytical Chemists, 13a ed", Horwitz, W. Ed.; AOAC International, Washington, DC, 1980.
Ahmadi et al. Shape-controlled synthesis of colloidal platinum nanoparticles Science 1996, 272, 1924-1925.
Al-Adhami, et al., "Immobilization of Wood-Rotting Fungi Laccases on Modified Cellulose and Acrylic Carriers", J. Process Biochemistry, 37:1387-1394 (2002).
Anderson, et al., "Structure and Properties of High Stability Geminal Dicationic Ionic Liquids", J. Amer. Chem. Soc.,127(2):593-604 (2005).
Ast, et al., "Efficient Assembly of Peptomers on Continuous Surfaces", Tetrahedron Lett., 40:4317-4318 (1999).
Astruc et al. Nanoparticles as recyclable catalysts: the frontier between homogeneous and heterogeneous catalysis. Angew Chem Int Ed Engl. 2005, 44, 7852-7872.
Axegard, "The Future Pulp Mill-A Biorefinery?", Presentation at 1st International Biorefinery Workshop, Washington, DC., Jul. 20-21, 2005.

Baran et al. Green heterogeneous Pd(II) catalyst produced from chitosan-cellulose micro beads for green synthesis of biaryls. Carbohydrate Polymers 2016, 152, 181-188.
Barber, et al., "A 'green' Industrial Revolution: Using Chitin towards Transformative Technologies", Pure Appl. Chem. 85, 2013, 1693-1701.
Barber, et al., "Electrospinning of Chitin Nanofibers Directly from an Ionic Liquid Extract of Shrimp Shells", Green Chem. 15, 2013, 601-607.
Barber, et al., "Surface Modification of Ionic Liquid-Spun Chitin Fibers for the Extraction of Uranium from Seawater: Seeking the Strength of Chitin and the Chemical Functionality of Chitosan", Green Chem. 16, 2014, 1828-1836.
Barber, Patrick S., "Coagulation of Chitin and Cellulose from 1-Ethyl-3-methylimidazolium Acetate Ionic-Liquid Solutions Using Carbon Dioxide", Angew. Chem. Int. Ed., v. 52, 2013, 12350-12353.
Bardeletti, Enzyme Immobilization on Polyethyleneimine-coaled Magnetite Particles, Methods in Biotech. I. Immobilization of Enzymes and Cells, pp. 133-141 (1997).
Bartlett, et al., "Chitin, Cholera, and Competence", Science, 310, 2005, 1775-1777.
Bayer et al. Economic and ecological comparison of granular activated carbon (GAC) adsorber refill strategies. Water Res. 2005, 39, 1719-1728.
Benton, et al., "Effect of Room-Temperature Ionic Liquids as Replacements for Volatile Organic Solvents in Free-Radical Polymerization", Ionic Liquids, 818:125-133 (2002).
Biedron, et al., "Ionic Liquids as reaction Media for Polymerization Processes: Atom Transfer Radical Polymerization (ATRP) of Acrylates in Ionic Liquids", Polymer Int'l., 52(10):1584-1588 (2003).
Black, et al., "The estimation of chitin and chitin nitrogen in crawfish waste and derived products", Analyst, 75, 1950, 185-189.
Blankemeyer-Menge, et al., "Simultaneous Multiple Synthesis of Protected Peptide Fragments on 'Allyl'—Functionalized Cellulose Disc Supports", Tetrahedron Lett., 29:5871-5874 (1988).
Bonhote, et al., "Hydrophobic, Highly Conductive Ambient-Temperature Molten Salts", Inorg. Chem.,35:1168-1178 (1996).
Bora, et al., "A Simple Method for Functionalization of Cellulose Membrane for Covalent Immobilization of Biomolecules", J. Membr. Sci., 250:215-222 (2005).
Brugnerotto, et al., "An infrared investigation in relation with chitin and chitosan characterization", Polymer, 42, 2001, 3569-3580.
Carlin, et al., "Advances in Nonaqueous Chemistry", Mamantov et al. Eds., VCH Publishing, New York, 1994.
Cateto, et al., "Monitoring of lignin-based polyurethane synthesis by FTIR-ATR", Ind. Crops Prod., 27(2):168-174 (2008).
Cauchie, et al., "An Attempt to estimate crustacean chitin production in the hydrosphere," 1997, 32-39.
Chen, et al., "Enhanced mechanical properties of novel chitosan nanocomposite fibers", Carbohydrate Polymers, 86(3), 2011, 1151-1156.
Chesney, et al., "Amino-Derivatised Beaded Cellulose Gels, Novel Accessible and Biodegradable Scavenger Resins for Solution Phase Combinatorial Synthesis", Green Chem., 2:57-62 (2000).
Cirtiu et al. Cellulose nanocrystallites as an efficient support for nanoparticles of palladium: application for catalytic hydrogenation and Heck coupling under mild conditions. Green Chem. 2011, 13, 288-291.
Cho, et al., "Physicochemical Characteristics and Functional Properties of Various Commercial Chitin and Chitosan Products," J. Agric. Food. Chem, 46, 1998, 3839-3843.
Coghlan, "Mouldy dressings help wounds heal", New Scientist, 145 (1970), 1995, 21.
Deng, et al., "Phase Diagram of [Amim]Cl + Salt Aqueous Biphasic Systems and Its Application for [Amim]Cl Recovery", J. Chem. Eng. Data 54, 2009, 2470-2473.
Ding, "Homogeneous synthesis and characterization of quaternized chitin in NaOH/urea aqueous solution," Carbohydrate Polymers, 87, 2012, 422-426.
Duan, et al., "High strength films with gas-barrier fabricated from chitin solution dissolved at low temperature," J. Mater. Chem. A, 1, 2013, 1867-187.

(56) References Cited

OTHER PUBLICATIONS

Deus et al., Partiell acetylierte Cellulose—Synthese and Bestimmung der Substituentenverteilung mil Hille der 1 H NMR-Spektroskopie, Makromol. Chem., 192(1):75-83 (1991).
Dubbs, et al., "Solubility of vitamin E (alpha-tocopherol) and vitamin K3 (menadione) in ethanol-water mixture", Journal of Chemical & Engineering Data, 43(4), 1998, 590-591.
Durkin et al. Lignocellulose Fiber- and Welded Fiber—Supports for Palladium—Based Catalytic Hydrogenation: A Natural Fiber Welding Application for Water Treatment. ACS Sustainable Chem. Eng. 2016, 4, 5511-5522.
Dutta, et al., "Chitin and chitosan: Chemistry, properties and applications", Journal of Scientific & Industrial Research, 63, 2004, 20-31.
Earle, et al., "Ionic liquids. Green Solvents for the future", Pure Appl. Chem., 72(7), 2000, 1391-1398.
El Seoud, et al., "Applications of ionic liquids in carbohydrate chemistry: A window of opportunities", Biomacromol, 8(9), 2007, 2629-2647.
Endres, et al., "Ionic Liquids: Solvents for the Electrodeposition of Metals and Semiconductors", Chem. Phys. Chem., 3(2), 2002, 144-154.
Erdmenger, et al., "Homogeneous tritylation of cellulose in 1-Butyl-3-methylimidazolium chloride", Macromol. Biosci, 2007, 440-445.
Exarhos et.al, Facile Stabilization of Gold-silver Alloy Nanoparticles on Cellulose Nanocrystal. J. Phys. Chem. C 2008, 112, 4844.
Fahmi et al. Functional hybrid materials. Mater. Today 2009, 12, 44-50.
Fan, et al., "Preparation and Properties of Alginate/Water-Soluble Chitin Blend Fibers", Journal of Macromolecular Science, Part A: Pure and Applied Chemistry, 42(6), 2005, 723-732.
Fannin, et al., "Properties of 1,3-Dialkylimidazolium Chloride-Aluminum Chloride Ionic Liquids. 2. Phase Transitions, Densities, Electrical Conductivities, and Viscosities", J. Phys. Chem., 88, 1984, 2614-2621.
Fischer, et al., "Structural Changes of Cellulose Dissolved in Molten Salt Hydrates", 19th ACS National Meeting, San Francisco, CA, (abstract), 2000.
Fischer et al, The behaviour of cellulose in hydrated melts of the composition LiX-nH20 (X=I-, NO-3, CH3COO-, CIO-4), Cellulose, 6:213-219 (1999).
Fort, et al., "Can ionic liquids dissolve wood? Processing and analysis of lignocellulosic materials with 1-n-butyl-3-methylimidazolium chloride", Green Chem., 9, 2007, 63-69.
Froehner, et al., "Properties of the Glycoprotein Laccase Immobilised by Two Methods", Acta Chem Scand B, 29, 1975, 691-694.
Fukaya, et al., "Cellulose dissolution with polar ionic liquids under mild conditions: required factors for anions", Green Chem., 10, 2008, 44-46.
Fukaya, et al., "Superior Solubility of Polysaccharides in Low Viscosity, Polar, and Halogen-Free 1,3-Dialkylimidazolium Formates", Biomacromolecules, 7, 2006, 3295-3297.
Fukuyama, et al., "A Copper-Free Sonogashira Coupling Reaction in Ionic Liquids and Its Application to a Microflow System for Efficient Catalyst Recycling", Org. Lett., 4(10), 2002, 1691-1694.
Gallezot, et al., "Process options for converting renewable feedstocks to bioproducts", Green Chem., 9, 2007, 295-302.
Gallon et al. Palladium Nanoparticles Supported on Polyaniline Nanofibers as a Semi-Heterogeneous Catalyst in Water. Angew. Chem. Int. Ed. 2007, 46, 7251-7254.
Geim et al., The Rise of Graphene, Nature Materials, 6:183-191 (2007).
Gelbrich, et al., "Colloidal Structures Based on Topochemically Modified Cellulose", Papier (Heidelberg), 52, 1998, 755-758.
Gemeiner, "Immobilized Enzymes, Organelles and Cells, in Enzyme Engineering, Gemeiner, Ed.", Ellis Horwood Series in Biochemistry and Biotechnology, Ellis Horwood Limited: West Sussex, England, 1992, 158-179.

Gholinejad et al. Agarose functionalized phosphorus ligand for stabilization of small sized palladium and copper nanoparticles: efficient heterogeneous catalyst for Sonogashira reaction. Tetrahedron 2016, 72, 2491-2500.
Gordon, et al., "Fused Organic Salts. 8. Properties of Molten Straight-Chain Isomers of Tetra-n-Pentylammonium Salts", J. Amer. Chem. Soc., 100(24), 1978, 7445-7454.
Guo et al. Noble metal nanomaterials: Controllable synthesis and application in fuel cells and analytical sensors. Nano Today 2001, 6, 240-264.
Gutowski, "Controlling the Aqueous Miscibility of Ionic Liquids: Aqueous Biphasic Systems of Water-Miscible Ionic Liquids and Water-Structuring Salts for Recycle, Metathesis, and Separations", J. Am. Chem. Soc. 125, 2003, 6632-6633.
Hardy et al. Chitosan-based heterogeneous catalysts for Suzuki and Heck reactions. Green Chem. 2004, 6, 53-56.
Hackman, et al., "Studies on chitin. VI. The nature of alpha- and beta-chitins," Austr. J. Biol. Chem., 18, 1965, 941-965.
Harkin, et al., "Lignification in Trees: Indication of Exclusive Peroxidase Participation", Science, 180, 1973, 296-98.
Hasegawa, et al., "New Pretreatment methods combining a hot water treatment and water/acetone extraction for thermo-chemical conversion of biomass", Energy and Fuels vol. 18, 2004, 755-760.
Heinze, et al., "Unconventional Methods in Cellulose Functionalization", Prog. Polym. Sci., 26, 2001, 1689-1762.
Hirano, et al., "An Improved Method for the Preparation of Colloidal Chitin by using Methanesulfonic Acid", Agric. Biol. Chem., 52, 1988, 2111-2112.
Hirayama, "Rapid Confirmation and Revision of the Primary Structure of Bovine Serum Albumin by ESIMS and Frit-FAB LC/MS", Biochem. Biophys. Comm.,173, 1990, 639-646.
Holbrey, et al., "Mercury(II) partitioning from aqueous solutions with a new, hydrophobic ethylene-glycol functionalized bis-imidazolium ionic liquid", Green Chem., 5, 2003, 129-135.
Holbrey, et al., "The Phase Behaviour of 1-Alkyl-3-Methlimidazolium Tetrafluoroborates; Ionic Liquids and Ionic Liquid Crystals", J. Chem. Soc. Dalton Trans., 1999, 2133-2139.
Hoogmoed, et al., "Fourier transform infrared spectroscopy studies of alginate—PLL capsules with varying compositions", J. Biomed. Mater. Res. A, 67, 2003, 172-178.
Huang et al. Electrospun carbon nanofibers decorated with Ag—Pt bimetallic nanoparticles for selective detection of dopamine. ACS Appl. Mater. Interfaces 2014, 6, 12449-12456.
Huddleston, et al., "Characterization and Comparison of Hydrophilic and Hydrophobic Room Temperature Ionic Liquids Incorporating the Imidazolium Cation", Green Chem., 3, 2001, 156-164.
Huddleston, et al., "Room Temperature Ionic Liquids as Novel Media for 'Clean' Liquid-Liquid Extraction", Chem. Commun, 1998, 1765-1766.
Hudson et al., The Solubility of Unmodified Cellulose: A Critique of the Literature, J. Macromol. Sci. Rev. Macromol. Chem., 18(1):1-82 (1980).
Hull et al. Pt nanoparticle binding on functionalized multiwalled carbon nanotubes. Chem. Mater. 2006, 18, 1780-1788.
Husemann, et al., "Homogeneous Acetylation of Cellulose", Buletinul Institutului Politehnic Din Lasi, 1(1-2), 1970, 47-51.
Husemann et al., N-Athyl-pyridinium-chlorid als Losungmittel and Reaktionsmedium fur Cellulose, Die Makromolekulare Chemie, 128:288-291 (1969).
Illanes, et al., "Immobilization of Lactase and Invertase on Cross-linked Chitin, in Bioreactor Immobilized Enzymes and Cells", Moo-Young, Ed., Elsevier Applied Science: London, 1998, 233-249.
Illanes, "Stability of Biocatalysts", Elec. J. Biotechnol., 2(1), 1999, 1-9.
Ishikawa et al., Pure ionic liquid electrolytes compatible with a graphitized carbon negative electrode in rechargeable lithium-ion batteries, J. of Power Sources, 162(1):658-662 (2006).
Jayakumar, et al., "Biomedical applications of chitin and chitosan based nanomaterials—a short review", Carb. Polym., 82, 2010, 227-232.

(56) References Cited

OTHER PUBLICATIONS

Jayakumar, et al., "Novel chitin and chitosan materials in wound dressing", Biomedical Engineering, Trends in Materials Science, 2011, 23 pages.
Jung, et al., "Production of chitin from red crab shell waste by successive fermentation with Lactobacillus paracasei KCTC-3074 and Serratia marcescens FS-3," Carbohydrate Polymers, 68, 2007, 746-750.
Kadokawa, et al., "A facile preparation of gel materials from a solution of cellulose in ionic liquid", Carbohydrate Research, 343, 2008, 769-772.
Kalra, et al., "Confined assembly of asymmetric block-copolymer nanofibers via multiaxial jet electrospinning", Small, 5, 2009, 2323-2332.
Kenealy, et al., "Pretreatments for Converting Wood into Paper and Chemicals, Materials, Chemicals and Energy from Forest Biomass", Argyropoulos, D.; ACS Symposium Series; American Chemical Society, Washington, DC, chapter 25, 2007, 392-408.
Khor, et al., "Implantable applications of chitin and chitosan", Biomaterials, 24(13), 2003, 2339-2349.
Kilpeläinen, et al., "Dissolution of wood in ionic liquids", J. Agric. Food Chem., 55, 2007, 9142-9148.
King et al. A platform for more sustainable chitin films from an ionic liquid process, Green Chem, 2016, DOI: 10.1039/C6GC02201D.
Kirk-Othmer, "Encyclopedia of Chemical Technology, 4"" Ed. 5", 1993, 476-563.
Kozlovskaya et al. pH-Responsive Layered Hydrogel Microcapsules as Gold Nanoreactors. Chem. Mater. 2009, 21, 2158-2167.
Krajewska, "Application of Chitin- and Chitosan-based Materials for Enzyme Immobilizations: A Review", Enz. Microb. Techno., 35, 2004, 126-139.
Kumar, et al., "A review of chitin and chitosan applications", React. Funct. Polym. 46, 2000, 1-27.
Lau, et al., "Dissolution of Candida Antarctica Lipase B in Ionic Liquids: Effects on Structure and Activity", Green Chem., 6, 2004, 483-487.
Laudenslager et al. "Carboxymethyl Chitosan as a Matrix Material for Platinum, Gold, and Silver Nanoparticles." Biomacromolecules, 2008, 9, 2682-2685.
Lawrie, "Interactions between alginate and chitosan biopolymers characterized using FTIR and XPS", Biomacromolecules, 8, 2007, 2533-2541.
Lee et al. "Chitosan as a Natural Polymer for Heterogeneous Catalysts Support: A Short Review on Its Applications." Appl. Sci. 2015, 5, 1272-1283.
Lee et al. Formation of Nanoparticle-Loaded Microcapsules Based on Hydrogen-Bonded Multilayers. Chem. Mater. 2005, 17, 1099-1105.
Lee, et al., "Advances in chitosan material and its hybrid derivatives: A review", The Open Biomaterials Journal, 1, 2009, 10-20.
Lee, et al., "Ionic Liquid-Mediated Selective Extraction of Lignin from wood leading to enhanced enzymatic cellulose hydrolysis", Biotech. and Bioeng., 102(5):1368-1376 (2009).
Leipner, et al., "Structural Changes of Cellulose Dissolved in Molten Salt Hydrates", Macromol Chem Phys, 201(15), 2000, 2041-2049.
Li et al. Nanocomposites of polymer and inorganic nanoparticles for optical and magnetic applications. Nano Rev. 2010, 1, 5214 DOI: 10.3402/nano.v1i0.5214.
Liebert, et al., "Tailored Cellulose Esters: Synthesis and Structure Determination", Biomacromolecules, 6, 2005, 333-340.
Lim, et al., "Biomedical-grade chitosan in wound management and its biocompatibility in vitro", Biopolymers, Chapter 2, 2010, 19-36.
Linko, et al., "Cellulose Bead Entrapped Microbial Cells Biotechnical Applications", Enzyme Microb. Technol., 1:26-30 (1979).
Liu et al., One-step ionic-liquid-assisted electrochemical synthesis of ionic liquid-functionalized graphene sheets directly from graphite, Adv. Func. Mater., 18:1518-1525 (2008).
Loupy, et al., "New solvent-free organic synthesis using focused microwave", Synthesis, pp. 1213-1234 (1998).
Ma, et al., "Reverse Atom Transfer Radical Polymerization of Methyl Methacrylate in Room-Temperature Ionic Liquids", J. Polymer Sci. Pt. A—Polymer Chem., 41:143-151 (2003).
Mahmoud, et al., "Unconventional approach for demineralization of deproteinized crustacean shells for chitin production", Arab. Am. J. Biochem. Biotechnol. 2007, 3, 1-9.
Maia, et al., "Cellulose Organic Solvents. 1. The Structure of Anhydrous N-Methylmorpholine N-Oxide and N-Methylmorphline N-Oxide Monohydrate", Acta Cryst., B37:1858-1862 (1981).
Mais, et al., "Modification of Cellulose Using Cellulose p-Toluene-Sulfonates as Intermediates", Zeszyty Naukowe Politechniki Slaskiej Chemm., 140:121-125 (1999).
Manageeswaran, et al., "Degradation of indulin, a kraft pine lignin, by Serratia marcescens", J. Environ. Sci. Health, Part B: Pesticides, Food Contaminants, and Agricultural Wastes, 42(3):321-327 (2007).
Marson, et al., "A Novel, Efficient Procedure for Acylation of Cellulose Under Homogeneous Solution Conditions", Appl. Polymer Sci., 74:1355-1360 (1999).
Martin et al., Anisotropic magnetism in field-structured composites, Phys. Rev. E., 61(3):2818-2830 (2000).
Mathews, et al., "Palladium catalysed Suzuki cross-coupling reactions in ambient temperature ionic liquids", Chem. Commun, 2000, 1249-1250.
Maxim, et al., "Reinforced magnetic cellulose fiber from ionic liquid solution", Nanomater Energy, 2012, 1, 225-236.
Mazurkiewicz, et al., "Conducting Polymer Electrochemistry in Ionic Liquids", Synthetic Metals, 135:31-32 (2003).
Menteşet.al, Green heterogeneous Pd(II) catalyst produced from chitosan-cellulose micro beads for green synthesis of biaryls. Carbohydrate Polymers 2016, 152, 181.
Miao, et al., "Electrospinning from room temperature ionic liquids for biopolymer fiber formation", Green Chem, 2010, 12, 1883-1892.
Min, et al., "Chitin and chitosan nanofibers: electrospinning of chitin and deacetylation of chitin nanofibers", Polymer, 45, 2004, 7137-7142.
Mingos, "Microwaves in Chemical Syntheses", Chem. Indus, 1994, 596-599.
Mori, et al., "Effect of chitin and its derivatives on the proliferation and cytokine production of fibroblasts in vitro", Biomaterails, 1997, 18(13), 947-951.
Muzzarelli. Biomedical Exploitation of Chitin and Chitosan via Mechano-Chemical Disassembly, Electrospinning, Dissolution in Imidazolium Ionic Liquids, and Supercritical Drying. Mar. Drugs 2011, 9, 1510-1533.
Nara, et al., "Lipase-Catalysed Polyester Synthesis in 1-Butyl-3-Methylimidazolium Hexafluorophosphate Ionic Liquid", Tetrahedron Lett., 44:1371-1373 (2003).
Ngo, et al., "Thermal Properties of Imidazolium Ionic Liquids", Thermochimica Acta, 357-358:97-102 (2000).
Nikiforidis et al. Polymer organogelation with chitin and chitin nanocrystals. RSC Adv. 2015, 5, 37789-37799.
No, et al., "Isolation and characterization of chitin from crawfish sell waste," J. Agric. Food Chem. 1989, 37, 575-579.
No, et al., "Control of Foam Formation by Antifoam during Demineralization of Crustacean Shell in Preparation of Chitin", Food Chem. 46, 1998, 3844.
Oh et al. Synthesis, Characterization, and Surface Immobilization of Metal Nanoparticles Encapsulated within Bifunctionalized Dendrimers. Langmuir 2003, 19, 10420-10425.
Ohno, et al., "A New Type of Polymer Gel Electrolyte: Zwitterionic Liquid/Polar Polymer Mixture", Electrochimica Acta, 48:2079-2083 (2003).
Okamato, et al., "Synthesis, Spectra, and Reactions of N-Triphenylmethylpyridinium Salts. Reactions of Triphenylmethyl Chloride with Pyridine Under High Pressure", J. Org. Chem., 35(11):3752-3756 (1970).
Pach'on et al. Transition-metal nanoparticles: synthesis, stability and the leaching issue. Applied Organometallic Chemistry 2008, 22, 288-299.
Padhye, et al., "Cellulose Degradation in Xanthate Process", J. App. Polymer Sci., 36:1475-1478 (1988).

(56) References Cited

OTHER PUBLICATIONS

Park, et al., "Applications of Chitin and its Derivatives in Biological Medicine", International Journal of Molecular Sciences, 2010, 11, 5152-5164.
Peirano et al. Palladium supported on chitosan hollow fiber for nitrotoluene hydrogenation. Journal of Membrane Science 2009, 329, 30-45.
Percot, et al., "Optimization of Chitin Extraction from Shrimp Shells", Biomacromolecules, vol. 4, 12-18, 2003.
Pérignon et al. Formation and Stabilization in Water of Metal Nanoparticles by a Hyperbranched Polymer Chemically Analogous to PAMAM Dendrimers. Chem. Mater. 2004, 16, 4856-4858.
Perrier, et al., "Reversible Addition—Fragmentation Chain Transfer Polymerization of Methacrylate, Acrylate and Styrene Monomers in 1-Alky1-3-Methylimidazolium Hexfluorophosphate", European Polymer J., 39(3):417-422 (2003).
Pinkert, et al., "Alkanolamine Ionic Liquids and their inability to dissolve crystalline cellulose", Ind. Eng. Chem. Res. 2010, 49(22), 11809-11813.
Piyakulawat, et al., "Preparation and Evaluation of Chitosan/Carrageenan Beads for Controlled Release of Sodium Diclofenac", AAPS PharmSciTech, 2007, 8(4), 20-130.
Prasad, et al., "Hydrogen Storage in Double Clathrates with tert-Butylamine", The Journal of Physical Chemistry A, Letters, 2009, 113(24), 6540-6543.
Prasad, et al., "Weak gel of chitin with ionic liquid, 1-allyl-3-methylimidazolium bromide", Int. J. Biol. Macromol. vol. 45, 2009, 221-225.
Pu, et al., "Ionic liquid as a green solvent for lignin", J Wood Chem. Technol, 27:23-3 (2007).
Qin, et al., "Dissolution or extraction of crustacean shells using ionic liquids to obtain high molecular weight purified chitin and direct production of chitin films and fibers, Green Chem., 12", Green Chem., 12, 2010, 968-971.
Quignard et al. From Hydrocolloids to High Specific Surface Area Porous Supports for Catalysis. Biomacromolecules 2005, 6, 2785.
Rahim et al. Heck Reactions Catalyzed by PAMAM-dendrimer Encapsulated Pd(0) Nanoparticles. Nano Lett. 2001, 1, 499-501.
Rathinamoorthy, et al., "Polysaccharide Fibers in Wound Management", International Journal of Pharmacy and Pharmaceutical Sciences, 201, 3(3), 38-44.
Reddy et al. Cellulose supported palladium(0) catalyst for Heck and Sonogashira coupling reactions. Journal of Molecular Catalysis A: Chemical 2006, 252, 12-16.
Remsing, et al., "Mechanism of cellulose dissolution in the ionic liquid 1-n-butyl-3-methylimidazolium chloride: a 13C and 35/37Cl NMR relaxation study on model systems", Chem. Commun, 2006, 1271-1273.
Ren, et al., "Synthesis of 1-Allyl-3-Methylimidazolium-Based Room Temperature Ionic Liquid and Preliminary Study of its Dissolving Cellulose", Acta Polymerica Sinica, 3:448-451 (2003) (abstract).
Rinaudo, et al., "Chitin and chitosan: Properties and application", Polym. Sci. 2006, 3, 603-632.
Rødde, et al., "A Seasonal Study of the Chemical Composition and Chitin Quality of Shrimp Shells obtained from Northern Shrimp (Pandalus borealis)", Carbohydrate Polymers, 71, 2008, 388-393.
Rodrigues, et al., "Biocompatibility of Chitosan Carriers with Application in Drug Delivery", Journal of Functional Biomaterials, 2012, 3, 615-641.
Rogers, et al., "Ionic Liquids—Solvents of the Future?", Science, 302:792-793 (2003).
Rutherford, et al., "Proceedings of the First International Conference on Chitin/Chitosan, ed. Muzzarelli and Pariser", 1978, 182-192.
Sakai, "Determination of Pore Size and Pore Size Distribution", J. Membr. Sci., 96:91-130 (1994).
Sashiwa, et al., "Chemical modification of chitin and chitosan 2: preparation and water soluble property of N-acylated or N-alkylated partially deacetylated chitins", Carbohydrate Polymers, 1999, 39, 127-138.
Scurto, et al., "Carbon dioxide induced separation of ionic liquids and water", Chem. Commun, 2003, 572-573.
Shahidi, et al., "Chitin, Chitosan, and Co-Products: Chemistry, Production, Applications, and Health Effects," Adv. Food Nutr. Res. 2005, 49, 93-135.
Shamshina et al. "Practical" Electrospinning of biopolymers in Ionic Liquids. ChemSusChem, 2017, 10, 106.
Shamshina et al. Chitin-Calcium Alginate Composite Fibers for Wound Care Dressings Spun from Ionic Liquid Solution. J. Mater. Chem. B, 2014, 25, 3924-3936.
Shen, "Comparison of hydrogels prepared with ionic-liquid-isolated vs. commercial chitin and cellulose", ACS Sustainable Chem. Eng. 2016, 4(2), 471-480.
Shen, et al., "Enhanced Performance of a Novel Polyviyl Amine/Chitosan/Graphene Oxide Mixed Matrix Membrane for CO2 Capture", ACS Sustainable Chem. Eng. 2015, 3(8), 1819-1829.
Shigemasa, et al., "Chemical modification of chitin and chitosan 1: preparation of partially deacetylated chitin derivatives via a ring-opening reaction with cyclic acid anhydrides in lithium chloride/N,N-dimethylacetamide", Carbohydr. Polym. 39, 1999, 237-243.
Shin et al. Facile Stabilization of Gold-silver Alloy Nanoparticles on Cellulose Nanocrystal. J. Phys. Chem. C 2008, 112, 4844-4848.
Shriver, et al., Inorganic Chemistry, W. H. Freeman & Co., New York, pp. 405-407 (1990).
Silva et al. Green processing of porous chitin structures for biomedical applications combining ionic liquids and supercritical fluid technology. Acta Biomater. 2011, 7, 1166, 1172.
Snedden, et al., "Cross-Linked Polymer-Ionic Liquid Composite Materials", Macromolecules, 36(12):4549-4556 (2003).
Stepnowski, "Solid-phase extraction of room-temperature imidazolium ionic liquids from aqueous environmental samples", Anal. Bioanal. Chem 381, 2005, 189-193.
Stöllner, et al., "Activation of Cellulose Membranes with 1,1'-Carbonyldiimidazole or 1-Cyano-4-Dimethylaminopyridinium Tetrafluoroborate as a Basis for the Development of Immunosensors", Anal. Biochem., 304:157-165 (2002).
Strauss, et al., "Invited Review. A combinatorial approach to the development of environmentally benign organic chemical preparations", Aust. J. Chem., 52, 1999, 823-96.
Suarez, et al., "Synthesis and Physical-Chemical Properties of Ionic Liquids Based on 1-n-Butyl-3-Methylimidazolium Cation", J. Chim. Phys., 95:1626-1639 (1998).
Sukhanova, et al., Vysokomol. Soedin. Ser. B 31 (1989) 381; Chem. Abstr. 111(20):175985n.
Sun, et al., "Complete dissolution and partial delignification of wood in the ionic liquid 1-ethyl-3-methylimidazolium acetate", Green Chem 11, 2009, 646-655.
Sun, et al., "Magnetite-embedded cellulose fibers prepared from ionic liquids", J. Mater. Chem., 18:283-290 (2008).
Sutto et al., Direct X-ray diffraction evidence for imidazolium intercalation into graphite from an ionic liquid, Electrochem Solid State Lett, 6(3):A50-A52 (2003).
Swatloski, et al., "Dissolution of Cellulose with Ionic Liquids", J. Am. Chem. Soc., 124:4974-4975 (2002).
Swatloski, et al., "Ionic Liquids for the Dissolution and Regeneration of Cellulose", Molten Salts XIII: Proceedings of the International Symposium, Trulove, P.C., DeLong, H.C., Mantz, R.A., Stafford, G.R., Matsunaga, M., Eds., The Electrochemical Society: Pennington, NJ, 19:155-164 (2002).
Synowiecki, et al., "Production, Properties, and Some New Applications of Chitin and Its Derivatives", Crit. Rev. Food Sci. Nutr., 43(2), 2003, 145-171.
Taepaiboon, et al., "Vitamin-loaded electrospun cellulose acetate nanofiber mats as transdermal and dermal therapeutic agents of vitamin A and vitamin E", European Journal of Biopharmacology, 2007, 67(2), 387-397.
Tiller, et al., "A Novel Efficient Enzyme-Immobilization Reaction on NH2 Polymers by Means of L-Ascorbic Acid", Biotechnol. Appl. Biochem., 30:155-162 (1999).
Tokura, et al., "Studies on Chitin. III. Preparation of Chitin Fibers", Polym. J., 11(10), 1979, 781-786.

(56) References Cited

OTHER PUBLICATIONS

Torres-Rendon et al. Mechanical Performance of Macrofibers of Cellulose and Chitin Nanofibrils Aligned by Wet-Stretching: A Critical Comparison. Biomacromolecules 2014, 15, 2709-2717.
Turner, "Immobilization of Biocatalysts Using Novel IL-Reconstituted Cellulosic Support Materials", Presentation on Apr. 19, 2005.
Turner, et al., "Ionic Liquid-Reconstituted Cellulose Composites as Solid Support Matrices for Biocatalyst Immobilization", Biomacromolecules 6, 2005, 2497-2502.
Turner, et al., "Production of Bioactive Cellulose Films Reconstituted from Ionic Liquids", Biomacromolecules, 5:1379-1384 (2004).
Tuzlakoglu, et al., "Production and Characterization of Chitosan Fibers and 3-D Fiber Mesh Scaffolds for Tissue Engineering Applications", Micromolecular Bioscience, 2004, 4, 811-819.
Valentin et al. From Hydrocolloids to High Specific Surface Area Porous Supports for Catalysis. Biomacromolecules 2005, 6, 2785-2792.
Verma et al. Carbon nanofibers decorated with oxo-rhenium complexes: Highly efficient heterogeneous catalyst for oxidation of amines with hydrogen peroxide. J. Mol. Catal. A: Chem. 2015, 402, 46-52.
Verma et al. Novel organic-inorganic hybrid mesoporous silica supported oxo-vanadium schiff base for selective oxidation of alcohols. Adv. Synth. Catal. 2011, 353, 1897-1902.
Valdez-Peña, et al., "Screening of Industrial Enzymes for Deproteinization of Shrimp Head for Chitin Recovery," Food Sci. Biotechnol. 2010, 19, 553-557.
Viculis et al., Intercalation and exfoliation routes to graphite nanoplatelets J. Mater. Chem., 15:974-978 (2005).
Vijayaraghavan, et al., "An Assessment on the Interaction of a Hydrophilic Ionic Liquid with Different Sorbents", Ind. Eng. Chem. Res., 48, 2009, 7283-7288.
Vincent et al. Chitosan-Supported Palladium Catalyst. 1. Synthesis Procedure. Ind. Eng. Chem. Res. 2002, 41, 5158-5164.
Visser, et al., "Task Specific Ionic Liquids for the Extraction of Metal Ions from Aqueous Solutions", Chem. Commun., 135-136 (2001).
Wada et al. Effect of supports on Pd—Cu bimetallic catalysts for nitrate and nitrite reduction in water. Catal. Today 2012, 185, 81-87.
Wang et al. Polyelectrolyte Multilayer Nanoreactors for Preparing Silver Nanoparticle Composites: Controlling Metal Concentration and Nanoparticle Size Langmuir 2002, 18, 3370-3375.
Wang, et al., "Chitosan-Alginate PEC Membrane as a Wound Dressing: Assessment of Incisional Wound Healing", Journal of Biomedical Materials Research, 2002, 63(5), 601-618.
Wasserscheid, "Ionic Liquids in Synthesis," 1st Ed., Wiley—VCH, 2002.
Wasserscheid, et al., "Ionic Liquids-New "Solutions" for Transition Metal Catalysis", Angew Chem Int Ed Engl. 39, 2000, 3772-3789.
Weckstrom, et al., "Entrapment of Whole Cell Yeast ß-Galactosidase in Precipitated Cellulose Derivatives", Food Process Eng., vol. 2, Applied Science Publishers Ltd., pp. 148-151 (1979).
Welton, "Room-Temperature Ionic Liquids. Solvents for Synthesis and Catalysis,", Chem Rev. 99, 1999, 2071-2083.
Wilkes, et al., "Air and Water Stable 1-Ethyl-3-methylimidazolium Based Ionic Liquids", J. Chem. Soc. Chem. Commun.,965-967 (1992).
Willauer, et al., "Investigation of aqueous biphasic systems for the separation of lignins from cellulose in paper pulping process", J. Chromatogr. B: Biomed. Sci. Applic., 743(1-2):127-135 (2000).
Wu, et al., "A novel biomass-ionic liquid platform for the utilization of native chitin", Polymer, 49, 2008, 2321-2327.
Wu, et al., "Do we understand the recyclability of ionic liquids?", Chem. Eur. J., 15, 2009, 1804-1810.
Wu, et al., "Homogeneous Acetylation of Cellulose in a New Ionic Liquid", Biomacromol., 5:266-268 (2004).
Xie, et al., "Chitin and chitosan dissolved in ionic liquids as reversible sorbents of CO2", Green Chem., 8, 2006, 630-633.
Yamazaki, et al., "An acidic cellulose-chitin hybrid gel as novel electrolyte for an electric double layer capacitor", Electrochem. Commun. vol. 11, 2009, 68-70.
Yilmaz et al. Preparation and characterization of physical gels and beads from chitin solutions. Carbohydr. Polym. 2003, 54, 479-488.
Younes, et al., "Chitin and Chitosan Preparation from Marine Sources. Structure, Properties, and Applications," Mar. Drugs 2015, 13, 1133-1174.
Younes, et al., "Chitin and chitosan preparation from shrimp shells using optimized enzymatic deproteinization," Process Biochem. 2012, 47, 2032-2039.
Yusof, et al., "Flexible chitin films as potential wound-dressing materials: Wound model studies", J Biomed Mater Res A, 2003, 66, 224.
Zaman, et al., "Physico-medical properties of wound dressing material and its biomedical application", Journal of the Mechanical Behavior of Biomedical Materials, 2011, 4(7), 1369-1375.
Zeng et al. Microstructure-stability relations studies of porous chitosan microspheres supported palladium catalysts International Journal of Biological Macromolecules 2012, 51, 730-737.
Zhang et al. Polymer microgels: reactors for semiconductor, metal, and magnetic nanoparticles. J. Am. Chem. Soc. 2004, 126, 7908-7914.
Zhang, et al., "Preparation and Properties of Bacterial Cellulose/Alginate Blend Bio-Fibers", Journal of Engineered Fibers and Fabrics, 2011, 6(3), 69-72.
Zhang, et al., "Preparation of Cellulose/Chitin Blend Bio-Fibers via Direct Dissolution", Cellulose Chemistry and Technology, 2009, 43, 393-398.
Zhou et al. Preparation of aligned porous chitin nanowhisker foams by directional freeze—casting technique. Carbohydr. Polym. 2014, 112, 277-283.
International Search Report and Written Opinion dated Dec. 6, 2018 in PCT/US2018/023964 (8 pages).

* cited by examiner ically, these metallic nanoparticles supported by a polymer matrix are particularly attractive due to the possibility of catalyst recovery, recyclability, and high product selectivity (Astruc D et al. *Angew Chem Int Ed Engl.* 2005, 44, 7852-7872). The majority of these supported catalysts have been developed on silica, poly(amidoamine) (PAMAM) dendrimers, or hyper-branched polymers, synthetic nanofibers, carbon nanofibers, or carbon nanotubes, said supports offering high surface area and porosity, which is ideal for catalytic applications. However, these catalysts do have drawbacks associated with processing of these supports into functional materials (films, membrane, etc.) and the stability of these supports stability under basic conditions (e.g., silica). Therefore, these catalysts have mostly been used as powders or suspensions, which are challenging to recover (Bayer P et al. *Water Res.* 2005, 39, 1719-1728). Furthermore, recent concerns about the negative environmental impact of plastics and carbon nanotubes have spurred the search for more environmentally friendly and sustainable alternatives for such synthetic polymeric matrices. Ideally, catalyst for industrial applications should possess the following properties: large surface area, high catalytic performance, suitable mechanical stability, solvent(s) compatibility, easy accessibility and removal, ease of regeneration (cost effectiveness), and environmental friendliness. A need exists for methods of making such catalysts. The methods described herein address these and other needs.

METAL PARTICLE-CHITIN COMPOSITE MATERIALS AND METHODS OF MAKING THEREOF

CROSS-REFERENCE TO RELATED APPLICATIONS

This application claims the benefit of priority to U.S. Application 62/476,019, filed Mar. 24, 2017, which is hereby incorporated herein by reference in its entirety.

BACKGROUND

Metal nanoparticles (NPs) supported by a polymeric matrix have gained significant attention in recent years due to numerous applications in optics, electronics, magnetic devices, and as catalysts. In the area of catalysis particularly, these metallic nanoparticles supported by a polymer matrix are particularly attractive due to the possibility of catalyst recovery, recyclability, and high product selectivity (Astruc D et al. *Angew Chem Int Ed Engl.* 2005, 44, 7852-7872). The majority of these supported catalysts have been developed on silica, poly(amidoamine) (PAMAM) dendrimers, or hyper-branched polymers, synthetic nanofibers, carbon nanofibers, or carbon nanotubes, said supports offering high surface area and porosity, which is ideal for catalytic applications. However, these catalysts do have drawbacks associated with processing of these supports into functional materials (films, membrane, etc.) and the stability of these supports stability under basic conditions (e.g., silica). Therefore, these catalysts have mostly been used as powders or suspensions, which are challenging to recover (Bayer P et al. *Water Res.* 2005, 39, 1719-1728). Furthermore, recent concerns about the negative environmental impact of plastics and carbon nanotubes have spurred the search for more environmentally friendly and sustainable alternatives for such synthetic polymeric matrices. Ideally, catalyst for industrial applications should possess the following properties: large surface area, high catalytic performance, suitable mechanical stability, solvent(s) compatibility, easy accessibility and removal, ease of regeneration (cost effectiveness), and environmental friendliness. A need exists for methods of making such catalysts. The methods described herein address these and other needs.

SUMMARY

In accordance with the purposes of the disclosed systems and methods, as embodied and broadly described herein, the disclosed subject matter relates to methods of making a metal particle-chitin composite material, metal particle-chitin composite materials themselves, methods of using metal particle-chitin composite materials, and articles made from metal particle-chitin composite materials.

Additional advantages of the disclosed process will be set forth in part in the description which follows, and in part will be obvious from the description, or can be learned by practice of the disclosed process. The advantages of the disclosed process will be realized and attained by means of the elements and combinations particularly pointed out in the appended claims. It is to be understood that both the foregoing general description and the following detailed description are exemplary and explanatory only and are not restrictive of the disclosed process, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification illustrate several aspects described below.

DETAILED DESCRIPTION

Figure 1:
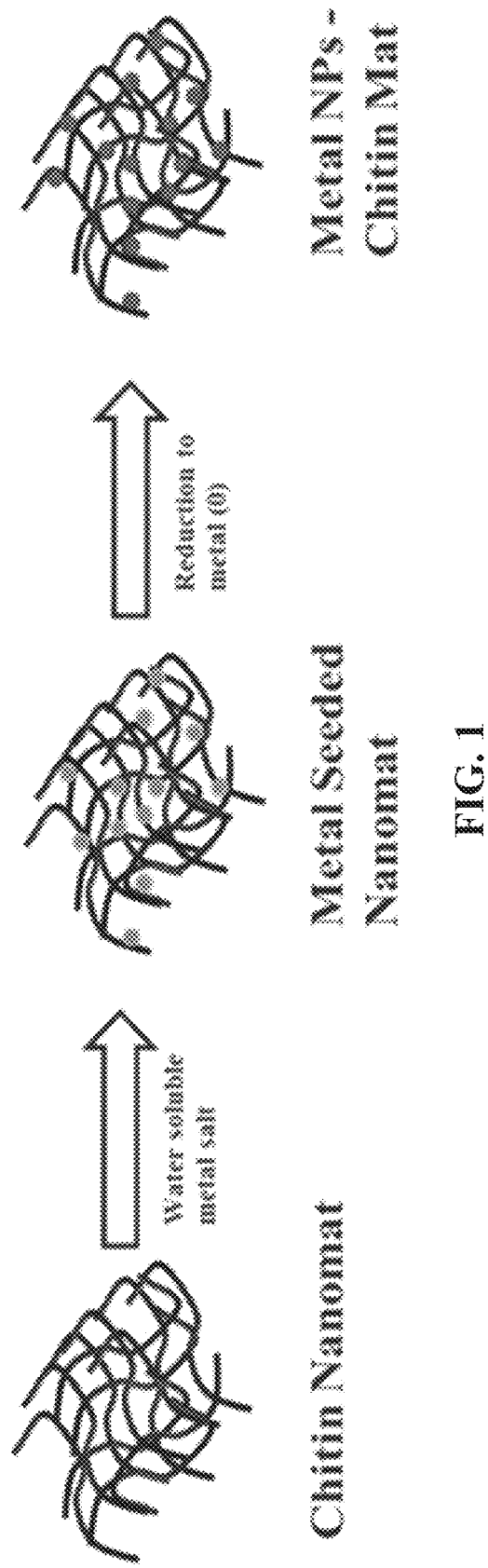
FIG. 1 is a schematic representation of in situ nanoparticles synthesis.

The materials, compounds, compositions, articles, and methods described herein can be understood more readily by reference to the following detailed description of specific aspects of the disclosed subject matter and the Examples and Figures included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an ionic liquid" includes mixtures of two or more such ionic liquids, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., Zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation acetylation, esterification, deesterification, hydrolysis, etc.

The term "anion" is a type of ion and is included within the meaning of the term "ion." An "anion" is any molecule, portion of a molecule (e.g., Zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., Zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, I-methyl-ethyl, butyl, I-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, eicosyl, tetracosyl, and the like. Alkyl substituents may be unsubstituted or substituted with one or more chemical moieties. The alkyl group can be substituted with one or more groups including, but not limited to, hydroxyl, halogen, acyl, alkyl, alkoxy, alkenyl, alkynyl, aryl, heteroaryl, aldehyde, amino, cyano, carboxylic acid, ester, ether, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure —CH=$CH_2$; 1-propenyl refers to a group with the structure -CH=CH—$CH_3$; and 2-propenyl refers to a group with the structure —$CH_2$—CH=$CH_2$. Asymmetric structures such as $(Z^1Z^2)C$=$C(Z^3Z^4)$ are intended to include both the E and Z isomers. This can be presumed in structural formulae herein wherein an asymmetric alkene is present, or it can be explicitly indicated by the bond symbol C=C. Alkenyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (e.g., $C_2$-$C_{24}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some embodiments, aryl groups include $C_6$-$C_{10}$ aryl groups. Examples of aryl groups include, but are not limited to, benzene, phenyl, biphenyl, naphthyl, tetrahydronaphtyl, phenylcyclopropyl, phenoxybenzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "acyl" as used herein is represented by the formula $-C(O)Z^1$ where $Z^1$ can be a hydrogen, hydroxyl, alkoxy, alkyl, alkenyl, alkynyl, aryl, heteroaryl, cycloalkyl, cycloalkenyl, heterocycloalkyl, or heterocycloalkenyl group described above. As used herein, the term "acyl" can be used interchangeably with "carbonyl." Throughout this specification "C(O)" or "CO" is a short hand notation for C=O.

The term "acetal" as used herein is represented by the formula $(Z^1Z^2)C(=OZ^3)(=OZ^4)$, where $Z^1$, $Z^2$, $Z^3$, and $Z^4$ can be, independently, a hydrogen, halogen, hydroxyl, alkyl, alkenyl, alkynyl, aryl, heteroaryl, cycloalkyl, cycloalkenyl, heterocycloalkyl, or heterocycloalkenyl group described above.

As used herein, the term "alkoxy" as used herein is an alkyl group bound through a single, terminal ether linkage; that is, an "alkoxy" group can be defined as to a group of the formula $Z^1-O-$, where $Z^1$ is unsubstituted or substituted alkyl as defined above. Unless otherwise specified, alkoxy groups wherein $Z^1$ is a $C_1$-$C_{24}$ (e.g., $C_1$-$C_{22}$, $C_1$-$C_{20}$, $C_1$-$C_{18}$, $C_1$-$C_{16}$, $C_1$-$C_{11}$, $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

The term "aldehyde" as used herein is represented by the formula $-C(O)H$. Throughout this specification "C(O)" is a short hand notation for C=O.

The terms "amine" or "amino" as used herein are represented by the formula $-NZ^1Z^2Z^3$, where $Z^1$, $Z^2$, and $Z^3$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The terms "amide" or "amido" as used herein are represented by the formula $-C(O)NZ^1Z^2$, where $Z^1$ and $Z^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula $-C(O)OH$. A "carboxylate" or "carboxyl" group as used herein is represented by the formula $-C(O)O^-$.

The term "cyano" as used herein is represented by the formula $-CN$.

The term "ester" as used herein is represented by the formula $-OC(O)Z^1$ or $-C(O)OZ^1$, where $Z^1$ can be an alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1OZ^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $Z^1C(O)Z^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

The term "hydroxyl" as used herein is represented by the formula —OH.

The term "nitro" as used herein is represented by the formula —$NO_2$.

The term "phosphonyl" is used herein to refer to the phospho-oxo group represented by the formula —P(O)$(OZ^1)_2$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "silyl" as used herein is represented by the formula —$SiZ^1Z^2Z^3$, where $Z^1$, $Z^2$, and $Z^3$ can be, independently, hydrogen, alkyl, alkoxy, alkenyl, alkynyl, aryl, heteroaryl, cycloalkyl, cycloalkenyl, heterocycloalkyl, or heterocycloalkenyl group described above.

The term "sulfonyl" or "sulfone" is used herein to refer to the sulfo-oxo group represented by the formula —$S(O)_2Z^1$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "sulfide" as used herein is comprises the formula —S—.

The term "thiol" as used herein is represented by the formula —SH.

"$R^1$," "$R^2$," "$R^3$," "$R^e$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

The term "hydrogen bond" describes an attractive interaction between a hydrogen atom from a molecule or molecular fragment X—H in which X is more electronegative than H, and an atom or a group of atoms in the same or different molecule, in which there is evidence of bond formation. The hydrogen bond donor can be a cation and the hydrogen bond acceptor can be an anion.

The term "complex" describes a coordination complex, which is a structure comprised of a central atom or molecule that is weakly connected to one or more surrounding atoms or molecules, or describes chelate complex, which is a coordination complex with more than one bond.

References to "mim," "$C_n$-mim," and "bmim" are intended to refer to a methyl imidazolium compound, an alkyl (with n carbon atoms) methyl imidazolium compound, and a butyl methylimidazolium compound respectively.

As used herein, the term "chitosan" means deacetylated chitin (at least 50% deacetylated) or any other form of chemically modified chitin.

Reference will now be made in detail to specific aspects of the disclosed materials, compounds, compositions, formulations, articles, and methods, examples of which are illustrated in the accompanying Examples and Figures.

Methods

Provided herein are methods of making and using composites, said composites comprising biopolymers (e.g., chitin) and monometallic and/or bimetallic nanoparticles (NPs). The biopolymeric support can include, for example, a) electrospun biopolymer networks; b) wet-jet fibers; c) films; and d) beads, with in situ synthesized metal nanoparticles dispersed thereon. The resulting biopolymer-nanoparticle composites comprise a large amount of the metal nanoparticles distributed within the biopolymer matrix and said composites are suitable for applications as optical materials or as catalysts for different coupling reactions. The production of the nanoparticles within the biopolymeric supports can be carried out by in situ reduction of metal salt precursors adsorbed on a preformed biopolymer support (e.g., in case of chitin said absorption is possible due to N-deacetylated surface). Nanoparticles (various nano-sizes, generally less than 10 nm in size, and various metals, such as Ag, Pt, Pd, Au, Pd/Au) were examined with respect to the catalytic activity of the metals supported on chitin, and were found to be supported during application and to catalytically perform in metal-catalyzed reactions (e.g., Suzuki coupling reaction).

Disclosed herein are methods of making metal particle-chitin composite materials, the methods comprising contacting an ionic liquid with chitin, thereby forming a mixture.

The term "ionic liquid" has many definitions in the art, but is used herein to refer to salts (i.e., an ionic compound of cations and anions) that are liquid at a temperature of at or below about 150° C. That is, at one or more temperature ranges or points at or below about 150° C. the disclosed ionic liquid compositions are liquid; although, it is understood that they can be solids at other temperature ranges or points. See e.g., Wasserscheid and Keim, *Angew Chem Int Ed Engl*, 2000, 39:3772; and Wasserscheid, "Ionic Liquids in Synthesis," 1$^{st}$ Ed., Wiley-VCH, 2002.

In some examples, the ionic liquid can be a liquid at a temperature of 150° C. or less (e.g., 140° C. or less, 130° C. or less, 120° C. or less, 110° C. or less, 100° C. or less, 90° C. or less, 80° C. or less, 70° C. or less, 60° C. or less, 50° C. or less, 40° C. or less, 30° C. or less, 20° C. or less, 10° C. or less, 0° C. or less, −10° C. or less, −20° C. or less, or −30° C. or less). Further, in some examples the disclosed ionic liquids can be liquid over a range of temperatures. For example, the disclosed ionic liquids can be liquids over a range of 1° C. or more (e.g., 2° C. or more, 3° C. or more, 4° C. or more, 5° C. or more, 6° C. or more, 7° C. or more, 8° C. or more, 9° C. or more, 10° C. or more, 11° C. or more, 12° C. or more, 13° C. or more, 14° C. or more, 15° C. or more, 16° C. or more, 17° C. or more, 18° C. or more, 19°

C. or more, or 20° C. or more). Such temperature ranges can begin and/or end at any of the temperature points disclosed above.

In further examples, the disclosed ionic liquids can be liquid at temperature from −30° C. to 150° C. (e.g., from −20° C. to 140° C., −10° C. to 130° C., from 0° C. to 120° C., from 10° C. to 110° C., from 20° C. to 100° C., from 30° C. to 90° C., from 40° C. to 80° C. from 50° C. to 70° C., from −30° C. to 50° C., from −30° C. to 90° C., from −30° C. to 110° C., from −30° C. to 130° C., from −30° C. to 150° C., from 30° C. to 90° C. from 30° C. to 110° C., from 30° C. to 130° C., from 30° C. to 150° C., from 0° C. to 100° C., from 0° C. to 70° C., or from 00 to 50° C.).

Further, exemplary properties of ionic liquids are high ionic range, non-volatility, non-flammability, high thermal stability, wide temperature for liquid phase, highly solvability, and non-coordinating. For a review of ionic liquids see, for example, Welton, *Chem Rev.*, 99:2071-2083, 1999; and Carlin et al., Advances in Nonaqueous Chemistry, Mamantov et al. Eds., VCH Publishing, New York, 1994. These references are incorporated by reference herein in their entireties for their teachings of ionic liquids.

The term "liquid" describes the compositions that are generally in amorphous, non-crystalline, or semi-crystalline state. For example, while some structured association and packing of cations and anions can occur at the atomic level, an ionic liquid composition can have minor amounts of such ordered structures and are therefore not crystalline solids. The compositions can be fluid and free-flowing liquids or amorphous solids such as glasses or waxes at temperatures at or below 150° C.

The ionic liquids of the present disclosure can comprise an organic cation and an organic or inorganic anion. The organic cation is typically formed by alkylation of a neutral organic species capable of holding a positive charge when a suitable anion is present.

Further, the ionic liquid can be composed of at least two different ions, each of which can independently and simultaneously introduce a specific characteristic to the composition not easily obtainable with traditional dissolution and formulation techniques. Thus, by providing different ions and ion combinations, one can change the characteristics or properties of the disclosed compositions in a way not seen by simply preparing various crystalline salt forms.

Examples of characteristics that can be controlled in the disclosed compositions include, but are not limited to, melting, solubility control, rate of dissolution, and a biological activity or function. It is this multi-nature/functionality of the disclosed ionic liquid compositions which allows one to fine-tune or design in very specific desired material properties. For example, the ionic liquids of the present disclosure can comprise at least one cation and at least one anion.

The organic cation of the ionic liquids disclosed herein can comprise a linear, branched, or cyclic heteroalkyl unit. The term "heteroalkyl" refers to a cation as disclosed herein comprising one or more heteroatoms chosen from nitrogen, oxygen, sulfur, boron, or phosphorous capable of forming a cation. The heteroatom can be a part of a ring formed with one or more other heteroatoms, for example, pyridinyl, imidazolinyl rings, that can have substituted or unsubstituted linear or branched alkyl units attached thereto. In addition, the cation can be a single heteroatom wherein a sufficient number of substituted or unsubstituted linear or branched alkyl units are attached to the heteroatom such that a cation is formed. For example, the cation $[C_n\text{mim}]$ where n is an integer of from 1 to 8 can be used. Preferably, ionic liquids with the cation $[C_{1-4}\text{mim}]$ can be used. A particularly useful ionic liquid is 1-ethyl-3-methyl-1H-imidazol-3-ium acetate, $[C_2\text{mim}]\text{OAc}$, having the formulae:

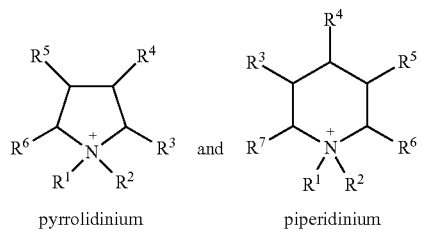

is an example of an ionic liquid comprising a cyclic heteroalkyl cation; a ring comprising 3 carbon atoms and 2 nitrogen atoms.

Other non-limiting examples of heterocyclic and heteroaryl units that can be alkylated to form cationic units include imidazole, pyrazoles, thiazoles, isothiazoles, azathiozoles, oxothiazoles, oxazines, oxazolines, oxazaboroles, dithiozoles, triazoles, selenozoles, oxahospholes, pyrroles, boroles, furans, thiophenes, phospholes, pentazoles, indoles, indolines, oxazoles, isothirazoles, tetrazoles, benzofurans, dibenzofurans, benzothiophenes, dibenzothoiphenes, thiadiazoles, pyrdines, pyrimidines, pyrazines, pyridazines, piperazines, piperidines, morpholines, pyrans, annolines, phthalazines, quinazolines, and quinoxalines.

The following are examples of heterocyclic units that are suitable for forming a cyclic heteroalkyl cation unit of the disclosed ionic liquids:

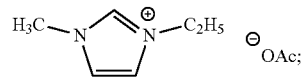

The following are further examples of heterocyclic units that are suitable for forming a cyclic heteroalkyl cation unit of the disclosed ionic liquids:

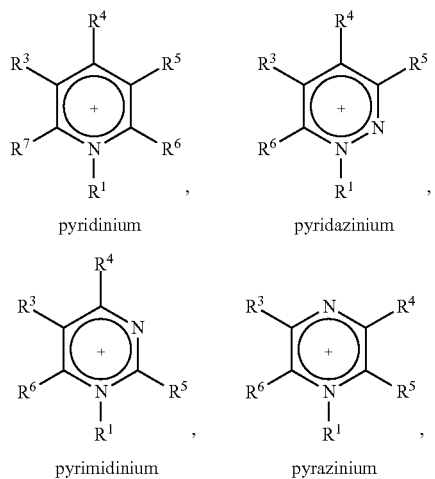

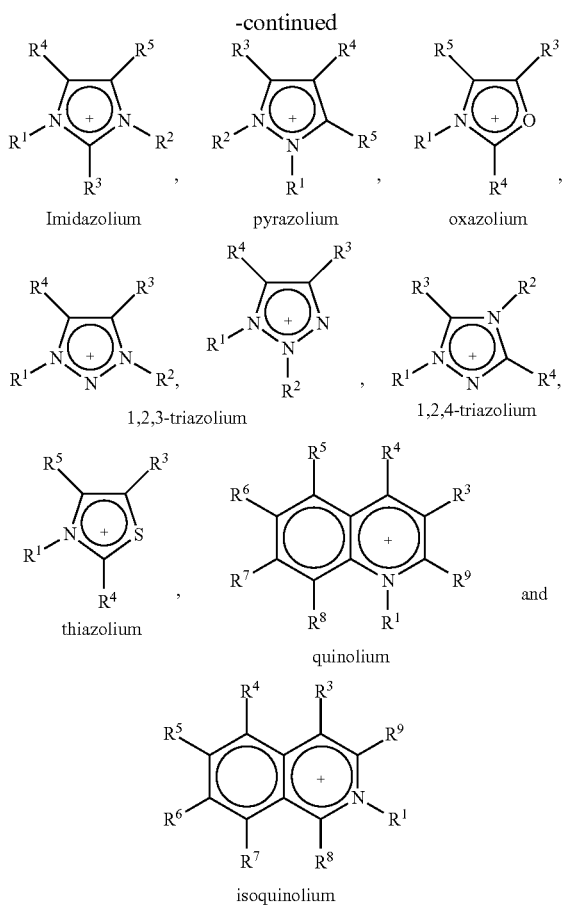

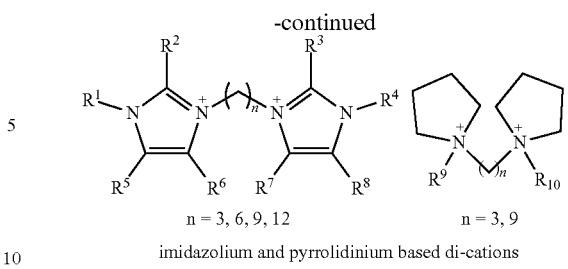

where each $R^1$ and $R^2$ is, independently, a substituted or unsubstituted linear, branched, or cyclic $C_1$-$C_6$ alkyl, or substituted or unsubstituted linear, branched, or cyclic $C_1$-$C_6$ alkoxy; each $R^3$, $R^4$, $R^5$, $R^6$, $R^7$, $R^8$, and $R^9$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl.

The following comprises yet another set of examples of heterocyclic units that are suitable for forming heterocyclic dication units of the disclosed ionic liquids and are referred to as such or as "geminal ionic liquids:" See Armstrong, D. W. et al., Structure and properties of high stability geminal dicationic ionic liquids, *J. Amer. Chem. Soc.* 2005; 127(2): 593-604; and Rogers, R. D. et al., Mercury(II) partitioning from aqueous solutions with a new, hydrophobic ethyleneglycol functionalized bis-imidazolium ionic liquid, *Green Chem.* 2003; 5:129-135 included herein by reference in its entirety.

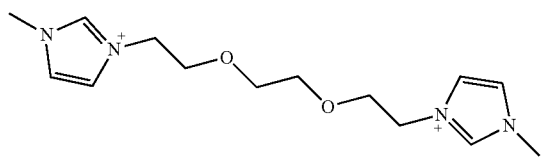

1,1'-[1,2-ethanediylbis(oxy-1,2-ethanediyl)]bis[3-methyl-1H-imidazolium-1-yl]

where $R^1$, $R^4$, $R^9$, and $R^{10}$ comprise a substituted or unsubstituted linear, branched, or cyclic $C_1$-$C_6$ alkyl, or substituted or unsubstituted linear, branched, or cyclic $C_1$-$C_6$ alkoxy; each $R^5$, $R^6$, $R^7$, and $R^8$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl.

The choice of the anion in the ionic liquid can be particularly relevant to the rate and level of chitin dissolution. While not wishing to be bound by theory, the primary mechanism of solvation of carbohydrates by an ionic liquid is the anion's ability to break the extensive hydrogen-bonding networks by specific interactions with hydroxyl groups. Thus, it is believed that that the dissolution of chitin is enhanced by increasing the hydrogen bond acceptance and basicity of the anion. For example, by using anions that can accept hydrogen bonds and that are relatively basic, one can not only dissolve pure chitin, but one can dissolve practical grade chitin and even extract chitin from raw biomass, as described herein. Accordingly, in some examples, the anions are substituted or unsubstituted acyl units $R^{10}CO_2^-$, for example, formate $HCO_2^-$, acetate $CH_3CO_2^-$ (also noted herein as [OAc]), proprionate, $CH_3CH_2CO_2^-$, butyrate $CH_3CH_2CH_2CO_2^-$, and benzylate, $C_6H_5CO_2^-$; substituted or unsubstituted sulfates: $(R^{10}O)S(=O)_2O^-$; substituted or unsubstituted sulfonates $R^{10}SO_3^-$, for example $(CF_3)SO_3^-$; substituted or unsubstituted phosphates: $(R^{10}O)_2P(=O)O-$; and substituted or unsubstituted carboxylates: $(R^{10}O)C(=O)O^-$. Non-limiting examples of $R^{10}$ include hydrogen; substituted or unsubstituted linear branched, and cyclic alkyl; substituted or unsubstituted linear, branched, and cyclic alkoxy; substituted or unsubstituted aryl; substituted or unsubstituted aryloxy; substituted or unsubstituted heterocyclic; substituted or unsubstituted heteroaryl; acyl; silyl; boryl; phosphino; amino; thio; and seleno. In some examples, the anion is $C_{1-6}$ carboxylate.

Still further examples of anions are deprotonated amino acids, for example, Isoleucine, Alanine, Leucine. Asparagine, Lysine, Aspartic Acid, Methionine, Cysteine. Phenylalanine, Glutamic Acid, Threonine, Glutamine, Tryptophan, Glycine, Valine. Proline, Selenocysteine, Serine. Tyrosine, Arginine, Histidine, Omithine, Taurine.

It is also contemplated that other anions can be used in some instances, such as halides, (i.e., $F^-$, $Cl^-$, $Br^-$, and $I^-$), $CO_3^-$; $NO_2^-$, $NO_3^-$, $SO_4^-$, $CN^-$, arsenate(V), $AsX_6^-$; $AsF_6^-$, and the like; stibate(V) (antimony), $SbX_6^-$; $SbF_6^-$, and the like.

Other non-limiting examples of ionic liquid anions include substituted azolates, that is, five membered heterocyclic aromatic rings that have nitrogen atoms in either positions 1 and 3 (imidazolates); 1, 2, and 3 (1,2,3-triazolates); or 1, 2, 4 (1, 2, 4-triazolate). Substitutions to the ring occur at positions that are not located in nitrogen positions (these are carbon positions) and include CN (cyano-), $NO_2$ (nitro-), and $NH_2$ (amino) group appended to the heterocyclic azolate core.

In some examples of suitable ionic liquids, an anion is chosen from formate, acetate, propionate, butyrate, $(CF_3)SO_3^-$, $(R^{10}O)S(=O)_2O^-$; $(R^{10}O)_2P(=O)O^-$; $(R^{10}O)C(=O)O^-$; and $R^{10}CO_2^-$; each $R^{10}$ is independently $C_1$-$C_6$ alkyl. The anion portion of the ionic liquid can be written without the charge, for example, OAc, $CHO_2$, Cl, Br, $RCH_3OPO_2$, and $PF_6$.

In some examples, wherein the ionic liquid comprises a cation and an anion, wherein the cation is selected from the group consisting of:

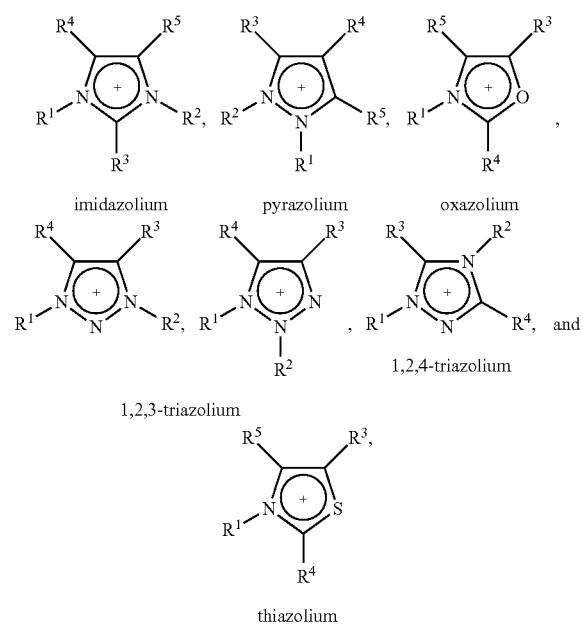

imidazolium    pyrazolium    oxazolium 1,2,3-triazolium    1,2,4-triazolium thiazolium where each $R^1$ and $R^2$ is, independently, a substituted or unsubstituted linear, branched, or cyclic $C_1$-$C_6$ alkyl, or substituted or unsubstituted linear, branched, or cyclic $C_1$-$C_6$ alkoxy; each $R^3$, $R^4$, and $R^5$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl; and wherein the anion is selected from the group consisting of $C_{1-6}$ carboxylate, halide, $CO_3^{2-}$; $NO_2^-$, $NO_3^-$, $SO_4^{2-}$, $CN^-$, $R^{10}CO_2$, $(R^{10}O)_2P(=O)O$, $(R^{10}O)S(=O)_2O$, or $(R^{10}O)C(=O)O$; where $R^{10}$ is hydrogen; substituted or unsubstituted linear, branched, or cyclic alkyl; substituted or unsubstituted linear, branched, or cyclic alkoxy; substituted or unsubstituted aryl; substituted or unsubstituted aryloxy; substituted or unsubstituted heterocyclic; and substituted or unsubstituted heteroaryl.

In some examples, the ionic liquid contains an aromatic cation. In some examples, the ionic liquid contains an imidazolium cation. In some examples, the ionic liquid is a 1-alkyl-3-alkyl imidazolium $C_1$-$C_6$ carboxylate. In some examples, the ionic liquid is 1-ethyl-3-methylimidazolium acetate ([$C_2$mim]OAc).

Any ionic liquid that effectively dissolves the chitin can be used in the methods disclosed herein. What is meant by "effectively dissolves" is 25% by weight or more of the chitin present is solubilized (e.g., 45% or more, 60% or more, 75% or more, or 90% or more). The formulator can select the ionic liquid for use in the disclosed methods by the one or more factors, for example, solubility of the chitin.

It is further understood that the disclosed ionic liquids can include solvent molecules (e.g., water); however, these solvent molecules are not required to be present in order to form the ionic liquids. That is, these compositions can contain, at some point during preparation and application no or minimal amounts of solvent molecules that are free and not bound or associated with the ions present in the ionic liquid composition.

The disclosed ionic liquids can be substantially free of water in some examples (e.g., immediately after preparation of the compositions and before any further application of the compositions). By substantially free is meant that water is present at less than 10, 9, 8, 7, 6, 5, 4, 3, 2, 1, 0.5, 0.25, or 0.1 wt. %, based on the total weight of the composition.

The ionic liquids can, after preparation, be further diluted with solvent molecules (e.g., water) to form a solution suitable for application. Thus, the disclosed ionic liquids can be liquid hydrates, solvates, or solutions. It is understood that solutions formed by diluting ionic liquids, for example, possess enhanced chemical properties that are unique to ionic liquid-derived solutions.

Chitin is an N-acetyl-D-glucosamine polymer that has a similar structure to cellulose. It is the most abundant polymer in the marine environment. Chitin is the main component of the exoskeletons of arthropods, such as crustaceans and in the cell walls of fungi. It has been a major source of surface pollution in coastal areas. Both chitin and its major derivative chitosan (obtained by deacetylation of chitin) have numerous applications. The bioactivity, biocompatibility, and low toxicity of native or chemically-modified chitin and chitosan make them suitable for controlled drug release, cosmetics, food preservation, fertilizer, or biodegradable packaging materials, or waste water processing and other industrial applications. Chitin, however, is highly hydrophobic and is insoluble in water and most organic solvents due to the high density of hydrogen bonds of the adjacent chains in solid state. The difficulty in the dissolution restricts the use of chitin as a replacement for synthetic polymers.

Crustacean shells are currently the major source of chitin available for industrial processing. The best characterized sources of chitin are shellfish (including shrimp, crab, lobster, and krill), oyster, and squids. Annual synthesis of chitin in freshwater and marine ecosystem is about 600 and 1600 million tons, respectively. Producing chitin in industry is primarily from the exoskeletons of marine crustacean shell waste by a chemical method that involves acid demineralization, alkali deproteinization, followed by decolorization. Even though the current industrialized chemical process isolates chitin from crustacean shells efficiently, disadvantages exist in these procedures, including the use of corrosive acids, bases, and strong oxidants which are not environmentally friendly. In addition, these processes can modify or nullify the desired physiochemical properties of chitin, for example, by acid demineralization, shorting the chitin chain length, as well as, degrading the chitin during deproteinization in hot alkali solutions. These undesired changes in the properties of chitin can have a profound affect when the chitin obtained therefrom must have specific molecular weight distributions and degrees of acetylation (DA).

The disclosed methods can also extract chitin from a variety of other sources. The source of chitin can be chitinous biomass, pure chitin, technical or practical grade chitin, ground or pulverized exoskeleton of arthropods, i.e., crustaceans.

In some examples, contacting the ionic liquid with the chitin comprises dissolving or dispersing at least a portion of a source of the chitin in the ionic liquid. In some examples, the source of the chitin can comprise a biomass. For example, the disclosed methods can be used to extract a wide variety of chitin from various biomasses. The disclosed methods can make use of various types of biomass and thereby solubilize chitin therefrom.

The term "biomass," as used herein, refers to living or dead biological material that can be used in one or more of the disclosed methods. In the disclosed methods, the "biomass" can comprise any chitinous biomass and can include materials comprising chitin, chitosan, their mixtures, and breakdown products (e.g., metabolites). Biomass can also comprise additional components, such as protein and/or lipid. Biomass can be derived from a single source, or biomass can comprise a mixture derived from more than one source.

Chitinous biomass can, in some examples, comprise an arthropod biomass, a fungi biomass, or a combination thereof. An arthropod biomass can, for example, comprise the exoskeleton of an arthropod chosen from shrimp, prawn, crayfish, crab, lobster, insect, and combinations thereof. In some examples, the chitinous biomass can contain chitin and non-chitin material.

In some examples, the source of chitin is pure chitin, for example, pure chitin obtained from crab shells, C9752, available from Sigma. St. Louis, Mo. In other examples, the source of chitin is practical grade chitin obtained from crab shells, C7170, available from Sigma, St. Louis, Mo. In further examples, the source of chitin is chitinous biomass, such as shrimp shells that are removed from the meat by peeling and processed to insure all shrimp meat is removed. However, any biomass comprising chitin or mixtures of chitin and chitosan, or mixtures of chitin, chitosan, and other polysaccharides can be used as the source of chitin.

When contemplating the biomass or source of chitin, the formulator can take into consideration the amount of chitin that comprises the biomass or source of chitin. For example, "pure chitin" can comprise from 75% to 85% by weight of chitin. "Technical grade" or "practical grade" chitin can comprise from 70% to 80% by weight of chitin. As it relates to crude biomass sources, one example of shrimps skins or shells comprises 27.2% chitin by weight, while, one example of crab shells comprises 23.9% chitin by weight.

Chitin derived from crustaceans is available from suppliers as "pure chitin" and as "practical grade chitin" and can be used herein. These forms of chitin undergo a process similar to the Kraft Process for obtaining cellulose from wood or other sources of cellulose. During the process of preparing pure chitin and practical grade chitin, there is a breakdown of the polysaccharide chains such that the resulting chitin has a shorter chain length and therefore a lower average molecular weight than it had before it was processed. Consequently, the separated chitin obtained when using the disclosed methods with these sources of chitin will likewise be of lower molecular weight than had the disclosed methods been followed with unprocessed chitinous biomass. Nonetheless, it can still be useful in various circumstances to use pure or practical grade chitin in the disclosed methods. Thus, in certain examples of the disclosed methods, the source of chitin can be pure or practical grade chitin.

One benefit of the disclosed methods, however, is that chitin can be obtained directly from chitinous biomass. As such, the disclosed methods provide a method of directly extracting chitin from a chitinous biomass without substantially shortening the polysaccharide chains. As such, the disclosed methods provide a unique method for obtaining polymeric materials comprising chitin that has the original full polysaccharide chain length (and molecular weight). Moreover, the chitin can be substantially free of agents that are typically found in pure and practical grade chitin, such as methanesulfonic acid, trichloroacetic acid, dichloroacetic acid, formic acid, and dimethylacetamide. Thus, in certain examples of the disclosed methods, the source of chitin can be chitinous biomass.

In some examples, the concentration of chitin in the mixture can be 0.1 wt % (e.g., 1 wt % or more, 2 wt % or more, 3 wt 6 or more, 4 wt % or more, 5 wt % or more, 6 wt % or more, 7 wt % or more, 8 wt % or more, 9 wt % or more, 10 wt % or more, 11 wt % or more, 12 wt % or more, 13 wt % or more, 14 wt % or more, 15 wt % or more, 16 wt % or more, 17 wt % or more, 18 wt % or more, 19 wt %6 or more, 20 wt % or more, 21 wt % or more, 22 wt % or more, 23 wt % or more, or 24 wt % or more). In some examples, the concentration of chitin in the mixture can be 25 wt % or less (e.g., 24 wt % or less, 23 wt % or less, 22 wt % or less, 21 wt % or less, 20 wt % or less, 19 wt % or less, 18 wt % or less, 17 wt % or less, 16 wt % or less, 15 wt % or less, 14 wt % or less, 13 wt % or less, 12 wt % or less, 11 wt % or less, 10 wt % or less, 9 wt % or less, 8 wt % or less, 7 wt % or less, 6 wt % or less, 5 wt % or less, 4 wt % or less, 3 wt % or less, 2 wt % or less, or 1 wt % or less). The concentration of chitin in the mixture can range from any of the minimum values described above to any of the maximum values described above. For example, the concentration of chitin in the mixture can be from 0.1 wt % to 25 wt % (e.g., from 0.1 wt % to 12 wt %, from 12 wt % to 25 wt %, from 0.1 wt % to 5 wt %, from 5 wt % to 10 wt % from 10 wt % to 15 wt %, from 15 wt % to 20 wt %, from 20 wt % to 25 wt %, or from 1 wt % to 20 wt %).

In some examples, the chitin source can be dissolved or dispersed in the ionic liquid at a temperature of 0° C. or more (e.g., 5° C. or more, 10° C. or more, 15° C. or more, 20° C. or more, 25° C. or more, 30° C. or more, 35° C. or more, 40° C. or more, 45° C. or more, 50° C. or more, 60° C. or more, 70° C. or more, 80° C. or more, 90° C. or more, 100° C. or more, 110° C. or more, 120° C. or more, 130° C. or more, 140° C. or more, 150° C. or more, 160° C. or more, 170° C. or more, or 180° C. or more). In some examples, the chitin source can be dissolved or dispersed in the ionic liquid at a temperature of 190° C. or less (e.g., 180° C. or less, 170° C. or less, 160° C. or less, 150° C. or less, 140° C. or less, 130° C. or less, 120° C. or less, 110° C. or less, 100° C. or less, 90° C. or less, 80° C. or less, 70° C. or less, 60° C. or less, 50° C. or less, 45° C. or less, 40° C. or less, 35° C. or less, 30° C. or less, 25° C. or less, 20° C. or less, 15° C. or less, 10° C. or less, or 5° C. or less). The temperature at which the chitin source is dissolved or dispersed in the ionic liquid can range from any of the minimum values described above to any of the maximum values described above. For example, the chitin source can be dissolved or dispersed in the ionic liquid at a temperature of from 0° C. to 190° C. (e.g., from 0° C. to 90° C., from 90° C. to 190° C., from 0° C. to 50° C., from 50° C. to 100° C., from 100° C. to 190° C. from 0° C. to 150° C., from 0° C. to 40° C., or from 20° C. to 40° C.).

In some examples, the ionic liquid is contacted with the chitin under agitation. The agitation can, for example, comprise sonicating, stirring, or a combination thereof.

The methods can further comprise, for example, agitating the mixture. In some examples, agitating the mixture can comprise sonicating the mixture or stirring the mixture. The methods can, for example, further comprise heating the mixture at a temperature of 0° C. or more (e.g., 5° C. or more, 10° C. or more, 15° C. or more, 20° C. or more, 25° C. or more, 30° C. or more, 35° C. or more, 40° C. or more, 45° C. or more, 50° C. or more, 60° C. or more, 70° C. or more, 80° C. or more, 90° C. or more, 100° C. or more, 110° C. or more, 120° C. or more, 130° C. or more, 140° C. or more, 150° C. or more, 160° C. or more, 170° C. or more, or 180° C. or more). In some examples, the mixture can be heated at a temperature of 190° C. or less (e.g., 180° C. or less, 170° C. or less, 160° C. or less, 150° C. or less, 140° C. or less, 130° C. or less, 120° C. or less, 110° C. or less, 100° C. or less, 90° C. or less, 80° C. or less, 70° C. or less, 60° C. or less, 50° C. or less, 45° C. or less, 40° C. or less, 35° C. or less, 30° C. or less, 25° C. or less, 20° C. or less, 15° C. or less, 10° C. or less, or 5° C. or less). The temperature at which the mixture is heated can range from any of the minimum values described above to any of the maximum values described above. For example, the mixture can be heated at a temperature of from 0° C. to 190° C. (e.g., from 0° C. to 90° C., from 90° C. to 190° C., from 0° C. to 50° C., from 50° C. to 100° C., from 100° C. to 190° C., from 0° C. to 150° C., from 0° C. to 40° C. or from 20° C. to 40° C.).

The methods further comprise contacting the mixture with a non-solvent, thereby forming a chitin substrate in the non-solvent and collecting the chitin substrate from the non-solvent. The chitin substrate can be collected in any manner chosen by the formulator, for example, the chitin substrate can be removed by centrifugation, filtration, or by decanting the non-solvent.

The non-solvent can also be referred to as a coagulant. The non-solvent can, for example, be water, a $C_1$-$C_{12}$ linear or branched alcohol, ketone (e.g., acetone or methylethylketone), or a mixture thereof. In some examples, the non-solvent is water, a $C_1$-$C_4$ alcohol, ketone, or a mixture thereof. Examples of $C_1$-$C_4$ alcohols include, but are not limited to methanol, ethanol, propanol, iso-propanol, butanol, sec-butanol, iso-butanol, or tert-butanol. In some examples, the non-solvent is water.

In some examples, the methods can further comprise separating at least a portion of the ionic liquid from the non-solvent, thereby forming a recycled ionic liquid. The recycled ionic liquid can, in some example, be used to contact the chitin.

In some examples, the chitin substrate is formed into a fiber, a film, a bead, a mat, a hydrogel, a nanogel, a microgel, an aerogel, a capsule, a tube, or a combination thereof. In some examples, the chitin substrate is formed into a plurality of fibers, and the plurality of fibers have an average diameter of 5 nm or more (e.g., 10 nm or more, 15 nm or more, 20 nm or more, 30 nm or more, 40 nm or more, 50 nm or more, 75 nm or more, 100 nm or more, 125 nm or more, 150 nm or more, 200 nm or more, 250 nm or more, 300 nm or more, 350 nm or more, 400 nm or more, 500 nm or more, 600 nm or more, 700 nm or more, 800 nm or more, 900 nm or more, 1 μm or more, 2 μm or more, 3 μm or more, 4 μm or more, 5 μm or more, 10 μm or more, 15 μm or more, 20 μm or more, 30 μm or more, 40 μm or more, 50 μm or more, 75 μm or more, 100 μm or more, 125 μm or more, 150 μm or more, or 175 μm or more). In some examples, the plurality of fibers can have an average diameter of 200 μm or less (e.g., 175 μm or less, 150 μm or less, 125 μm or less, 100 μm or less, 75 μm or less, 50 μm or less, 40 μm or less, 30 μm or less, 20 μm or less, 15 μm or less, 10 μm or less, 5 μm or less, 4 μm or less, 3 μm or less, 2 μm or less, 1 μm or less, 900 nm or less, 800 nm or less, 700 nm or less, 600 nm or less, 500 nm or less, 400 nm or less, 350 nm or less, 300 nm or less, 250 nm or less, 200 nm or less, 150 nm or less, 125 nm or less, 100 nm or less, 75 nm or less, 50 nm or less, 40 nm or less, 30 nm or less, 20 nm or less, 15 nm or less, or 10 nm or less). The average diameter of the plurality of fibers can range from any of the minimum values described above to any of the maximum values described above. For example, the plurality of fibers can have an average diameter of from 5 nm to 200 μm (e.g., from 5 nm to 100 μm, from 100 μm to 200 μm, from 5 nm to 50 nm, from 50 nm to 100 nm, from 100 nm to 500 nm, from 500 nm to 1 μm, from 1 μm to 50 μm, from 50 μm to 200 μm, or from 5 nm to 25 μm).

In some examples, the chitin substrate can be formed into a fiber, a film, a bead, a mat, a hydrogel, a nanogel, a microgel, an aerogel, a capsule, a tube, or a combination thereof by electrospinning, wet jet fiber pulling, film casting, bead preparation, capsule preparation, gel preparation, self-assembly, or a combination thereof.

Electrospinning can, for example, be performed at a potential of 15 kV or more (e.g., 16 kV or more, 17 kV or more, 18 kV or more, 19 kV or more, 20 kV or more, 21 kV or more, 22 kV or more, 23 kV or more, 24 kV or more, 25 kV or more, 26 kV or more, 27 kV or more, 28 kV or more, 29 kV or more, 30 kV or more, 31 kV or more, 32 kV or more, 33 kV or more, 34 kV or more, 35 kV or more, 36 kV or more, 37 kV or more, 38 kV or more, or 39 kV or more). In some example, electrospinning can be performed at a potential of 40 kV or less (e.g., 39 kV or less, 38 kV or less, 37 kV or less, 36 kV or less, 35 kV or less, 34 kV or less, 33 kV or less, 32 kV or less, 31 kV or less, 30 kV or less, 29 kV or less, 28 kV or less, 27 kV or less, 26 kV or less, 25 kV or less, 24 kV or less, 23 kV or less, 22 kV or less, 21 kV or less, 20 kV or less, 19 kV or less, 18 kV or less, 17 kV or less, or 16 kV or less). The potential the electrospinning is performed at can range from any of the minimum values described above to any of the maximum values described above. For example, the electrospinning can be performed at a potential of from 15 kV to 40 kV (e.g., from 15 kV to 27 kV, from 27 kV to 40 kV, from 15 kV 10 to 20 kV, from 20 kV to 25 kV, from 25 kV to 30 kV, from 30 kV to 35 kV, from 35 kV to 40 kV, or from 15 kV to 30 kV).

In some examples, the electrospinning can be performed at a flow rate of 50 mL/h or more (e.g., 75 mL/h or more, 100 mL/h or more, 125 mL/h or more, 150 mL/h or more, 175 mL/h or more, 200 mL/h or more, 225 mL/h or more, 250 mL/h or more, or 275 mL/h or more). In some examples, the electrospinning can be performed at a flow rate of 300 mL/h or less (e.g., 275 mL/h or less, 250 mL/h or less, 225 mL/h or less, 200 mL/h or less, 175 mL/h or less, 150 mL/h or less, 125 mL/h or less, 100 mL/h or less, or 75 mL/h or less). The flow rate that the electrospinning is performed at can range from any of the minimum values described above to any of the maximum values described above. For example, the electrospinning can be performed at a flow rate of from 50 mL/h to 300 mL/h (e.g., from 50 mL/h to 175 mL/h, from 175 mL/h to 300 mL/h, from 50 mL/h to 100 mL/h, from 100 mL/h to 150 mL/h, from 150 mL/h to 200 mL/h, from 200 mL/h to 250 mL/h, from 250 mL/h to 300 mL/h, or from 75 mL/h to 275 mL/h).

The methods further comprise deacetylating the collected chitin substrate, thereby forming a deacetylated chitin substrate. Deacetylating the collected chitin substrate can, for example, comprise contacting the collected chitin substrate with a deacetylating agent, the deacetylating agent being selected from sodium hydroxide, potassium hydroxide, calcium hydroxide, lithium hydroxide, tripotassium phosphate, enzymes, and combinations thereof.

In some examples, contacting the collected chitin substrate with the deacetylating agent comprises immersing the collected chitin substrate in a solution comprising the deacetylating agent. The concentration of the deacetylating agent in the solution can, for example, be 0.5 molar (M) or more (e.g., 1 M or more, 2 M or more, 3 M or more, 4 M or more, 5 M or more, 5.5 M or more, 6 M or more, 7 M or more, 8 M or more, 9 M or more, 10 M or more, 11 M or more, or 12 M or more). In some examples, the concentration of the deacetylating agent in the solution can be 12.5 M or less (e.g., 12 M or less, 11 M or less, 10 M or less, 9 M or less, 8 M or less, 7 M or less, 6 M or less, 5 M or less, 4 M or less, 3 M or less, 2 M or less, or 1 M or less). The concentration of the deacetylating agent in the solution can range from any of the minimum values described above to any of the maximum values described above. For example, the concentration of the deacetylating agent in the solution can be from 0.5 M to 12.5 M (e.g., from 0.5 M to 6 M, from 6 M to 12 M, from 0.5 M to 4 M, from 4 M to 8 M, from 8 M to 12.5 M, or from 1 M to 12 M).

In some examples, the collected chitin substrate is contacted with the deacetylating agent at a temperature of 50° C. or more (e.g., 55° C. or more, 60° C. or more, 65° C. or more, 70° C. or more, 75° C. or more, 80° C. or more, 85° C. or more, 90° C. or more, 95° C. or more, 100° C. or more, 105° C. or more, 110° C. or more, or 115° C. or more). In some examples, the collected chitin substrate can be contacted with the deacetylating agent at a temperature of 120° C. or less (e.g., 115° C. or less, 110° C. or less, 105° C. or less, 100° C. or less, 95° C. or less, 90° C. or less, 85° C. or less, 80° C. or less, 75° C. or less, 70° C. or less, 65° C. or less, 60° C. or less, or 55° C. or less). The temperature at which the collected chitin substrate is contacted with the deacetylating agent can range from any of the minimum values described above to any of the maximum values described above. For example, the collected chitin substrate can be contacted with the deacetylating agent at a temperature of from 50° C. to 120° C. (e.g., from 50° C. to 85° C., from 85° C. to 120° C., from 50° C. to 65° C., from 65° C. to 80° C., from 80° C. to 95° C., from 95° C. to 120° C., or from 60° C. to 100° C.).

The collected chitin substrate is contacted with the deacetylating agent for an amount of time sufficient to deacetylate the collected chitin substrate to the desired degree. The collected chitin substrate can, for example, be contacted with the deacetylating agent for an amount of time of 1 hour or more (e.g., 2 hours or more, 3 hours or more, 4 hours or more, 5 hours or more, 6 hours or more, 7 hours or more, 8 hours or more, 9 hours or more, 10 hours or more, 11 hours or more, 12 hours or more, 14 hours or more, 16 hours or more, 18 hours or more, 20 hours or more, 22 hours or more, 24 hours or more, 30 hours or more, 36 hours or more, or 42 hours or more). In some examples, the collected chitin substrate can be contacted with the deacetylating agent for an amount of time of 48 hours or less (e.g., 42 hours or less, 36 hours or less, 30 hours or less, 24 hours or less, 22 hours or less, 20 hours or less, 18 hours or less, 16 hours or less, 14 hours or less, 12 hours or less, 11 hours or less, 10 hours or less, 9 hours or less, 8 hours or less, 7 hours or less, 6 hours or less, 5 hours or less, 4 hours or less, 3 hours or less, or 2 hours or less). The amount of time that the collected chitin substrate is contacted with the deacetylating agent can range from any of the minimum values described above to any of the maximum values described above. For example, the collected chitin substrate can be contacted with the deacetylating agent for an amount of time of from 1 hour to 48 hours (e.g., from 1 hour to 24 hours, from 24 hours to 48 hours, from 1 hour to 6 hours, from 6 hours to 12 hours, from 12 hours to 18 hours, from 18 hours to 24 hours, from 24 hours to 30 hours, from 30 hours to 36 hours, from 36 hours to 42 hours, from 42 hours to 48 hours, or from 1 hour to 18 hours).

The methods further comprise contacting the deacetylated chitin substrate with a metal salt, thereby forming an impregnated precursor composite material. The metal salt can, for example, comprise a metal selected from the group consisting of Ag, Au, Pd, Pt, Cu, Fe, Ni, Co, or combinations thereof.

In some examples, contacting the deacetylated chitin substrate with a metal salt comprises contacting the deacetylated chitin substrate with a solution comprising the metal salt. Contacting the deacetylated chitin substrate with the solution comprising the metal salt can, for example, comprise immersing the deacetylated chitin substrate in the solution comprising the metal salt. In some examples, the concentration of the metal salt in the solution can be 0.1 wt % of metal ions or more (e.g., 0.5 wt % or more, 1 wt % or more, 2 wt % or more, 3 wt % or more, 4 wt % or more, 5 wt % or more, 6 wt % or more, 7 wt % or more, 8 wt % or more, 9 wt % or more, 10 wt % or more, 15 wt % or more, 20 wt % or more, 25 wt % or more, 30 wt % or more, or 35 wt % or more). In some examples, the concentration of the metal salt in the solution can be 40 wt % of metal ions or less (e.g., 35 wt % r less, 30 wt % or less, 25 wt % or less, 20 wt % or less, 15 wt % or less, 10 wt % or less, 9 wt % or less, 8 wt % or less, 7 wt % or less, 6 wt % or less, 5 wt % or less, 4 wt % or less, 3 wt % or less, 2 wt % or less, or 1 wt % or less). The concentration of the metal salt in the solution can range from any of the minimum values described above to any of the maximum values described above. For example, the concentration of the metal salt in the solution can be from 0.1 wt % to 40 wt % (e.g., from 0.1 wt % to 20 wt %, from 20 wt % to 40 wt %, from 0.1 wt % to 10 wt %, from 10 wt % to 20 wt %, from 20 wt % to 30 wt %, from 30 wt % to 40 wt %, or from 5 wt % to 35 wt %).

In some example, the solution comprising the metal salt comprises a first solution comprising a first metal salt and a second solution comprising a second metal salt, wherein the first metal salt comprises a first metal and the second metal salt comprises a second metal, and wherein the first metal and the second metal are different. The concentration of the first metal salt in the first solution can, for example, be 0.1 wt % of metal ions or more (e.g., 0.5 wt % or more, 1 wt % or more, 2 wt % or more, 3 wt % or more, 4 wt % or more, 5 wt % or more, 6 wt % or more, 7 wt % or more, 8 wt % or more, 9 wt % or more, 10 wt % or more, 15 wt % or more, 20 wt % or more, 25 wt % or more, 30 wt % or more, or 35 wt % or more). In some examples, the concentration of the first metal salt in the first solution can be 40 wt % of metal ions or less (e.g., 35 wt % or less, 30 wt % or less, 25 wt % or less, 20 wt % or less, 15 wt % or less, 10 wt % or less, 9 wt % or less, 8 wt % or less, 7 wt % or less, 6 wt % or less, 5 wt % or less, 4 wt % or less, 3 wt % or less, 2 wt % or less, or 1 wt % or less). The concentration of the first metal salt in the first solution can range from any of the minimum values described above to any of the maximum values described above. For example, the concentration of the first metal salt in the first solution can be from 0.1 wt % to 40 wt % (e.g., from 0.1 wt % to 20 wt %, from 20 wt % to 40 wt %, from 0.1 wt % to 10 wt %, from 10 wt % to 20 wt %, from 20 wt % to 30 wt %, from 30 wt % to 40 wt %, or from 5 wt % to 35 wt %.

The concentration of the second metal salt in the second solution can, for example, be 0.1 wt % of metal ions or more (e.g., 0.5 wt % or more, 1 wt % or more, 2 wt % or more, 3 wt % or more, 4 wt % or more, 5 wt % or more, 6 wt % or more, 7 wt % or more, 8 wt % or more, 9 wt % or more, 10 wt % or more, 15 wt % or more, 20 wt % or more, 25 wt % or more, 30 wt % or more, or 35 wt % or more). In some examples, the concentration of the second metal salt in the second solution can be 40 wt 6 of metal ions or less (e.g., 35 wt % or less, 30 wt % or less, 25 wt % or less, 20 wt % or less, 15 wt % or less, 10 wt % or less, 9 wt % or less, 8 wt % or less, 7 wt % or less, 6 wt % or less, 5 wt % or less, 4 wt % or less, 3 wt % or less, 2 wt % or less, or 1 wt % or less). The concentration of the second metal salt in the second solution can range from any of the minimum values described above to any of the maximum values described above. For example, the concentration of the second metal salt in the second solution can be from 0.1 wt % to 40 wt % (e.g., from 0.1 wt % to 20 wt %, from 20 wt % to 40 wt %, from 0.1 wt % to 10 wt %, from 10 wt % to 20 wt %, from 20 wt % to 30 wt %, from 30 wt % to 40 wt %, or from 5 wt % to 35 wt %).

The first solution and the second solution can, for example, be provided at a molar ratio of 0.1:1 or more (e.g., 0.2:1 or more, 0.3:1 or more, 0.4:1 or more, 0.5:1 or more, 0.6:1 or more, 0.7:1 or more, 0.8:1 or more, 0.9:1 or more, 1:1 or more, 1:0.9 or more, 1:0.8 or more, 1:0.7 or more, 1:0.6 or more, 1:0.5 or more, 1:0.4 or more, 1:0.3 or more, or 1:0.2 or more). In some example, the first solution and the second solution can be provided at a molar ratio of 1:0.1 or less (e.g., 1:0.2 or less, 1:0.3 or less, 1:0.4 or less, 1:0.5 or less, 1:0.6 or less, 1:0.7 or less, 1:0.8 or less, 1:0.9 or less, 1:1 or less, 0.9:1 or less, 0.8:1 or less, 0.7:1 or less, 0.6:1 or less, 0.5:1 or less, 0.4:1 or less, 0.3:1 or less, or 0.2:1 or less). The molar ratio at which the first solution and second solution are provided can range from any of the minimum values described above to any of the maximum values described above. For example, the first solution and the second solution can be provided at a molar ratio of from 0.1:1 to 1:0.1 (e.g., from 0.1:1 to 1:1, from 1:1 to 1:0.1, from 0.1:1 to 0.5:1, from 0.5:1 to 1:1, from 1:1 to 1:0.5, from 1:0.5 to 1:0.1, or from 0.5:1 to 1:0.5).

The deacetylated chitin substrate can, for example, be contacted with the metal salt at a temperature of 0° C. or more (e.g., 5° C. or more, 10° C. or more, 15° C. or more, 20° C. or more, 25° C. or more, 30° C. or more, 35° C. or more, 40° C. or more, 45° C. or more, 50° C. or more, 55° C. or more, 60° C. or more, 65° C. or more, 70° C. or more, 75° C. or more, 80° C. or more, 85° C. or more, 90° C. or more, or 95° C. or more). In some examples, the deacetylated chitin substrate can be contacted with the metal salt at a temperature of 100° C. or less (e.g., 95° C. or less, 90° C. or less, 85° C. or less, 80° C. or less, 75° C. or less, 70° C. or less, 65° C. or less, 60° C. or less, 55° C. or less, 50° C. or less, 45° C. or less, 40° C. or less, 35° C. or less, 30° C. or less, 25° C. or less, 20° C. or less, 15° C. or less, 10° C. or less, or 5° C. or less). The temperature at which the deacetylated chitin substrate is contacted with the metal salt can range from any of the minimum values described above to any of the maximum values described above. For example, the deacetylated chitin substrate can be contacted with the metal salt at a temperature of from 0° C. to 100° C. (e.g., from 0° C. to 50° C., from 50° C. to 100° C., from 0° C. to 20° C., from 20° C. to 40° C., from 40° C. to 60° C., from 60° C. to 80° C., from 80° C. to 100° C., or from 20° C. to 80° C.).

In some examples, the deacetylated chitin substrate can be contacted with the metal salt for an amount of time of 1 minute or more (e.g., 2 minutes or more, 3 minutes or more, 4 minutes or more, 5 minutes or more, 10 minutes or more, 15 minutes or more, 30 minutes or more, 45 minutes or more, 1 hour or more, 1.5 hours or more, 2 hours or more, 3 hours or more, 4 hours or more, 5 hours or more, 6 hours or more, 12 hours or more, 18 hours or more, 1 day or more, 1.5 days or more, 2 days or more, 3 days or more, 4 days or more, 5 days or more, 6 days or more, 1 week or more, 2 weeks or more, or 3 weeks or more). In some examples, the deacetylated chitin substrate can be contacted with the metal salt for an amount of time of 1 month or less (e.g., 3 weeks or less, 2 weeks or less, 1 week or less, 6 days or less, 5 days or less, 4 days or less, 3 days or less, 2 days or less, 1.5 days or less, 1 day or less, 18 hours or less, 12 hours or less, 6 hours or less, 5 hours or less, 4 hours or less, 3 hours or less, 2 hours or less, 1.5 hours or less, 1 hour or less, 45 minutes or less, 30 minutes or less, 15 minutes or less, 10 minutes or less, 5 minutes or less, 4 minutes or less, 3 minutes or less, or 2 minutes or less). The time for which the deacetylated chitin substrate is contacted with the metal salt can range from any of the minimum values described above to any of the maximum values described above. For example, the deacetylated chitin substrate can be contacted with the metal salt for an amount of time of from 1 minute to 1 month (e.g., from 1 minute to 1 day, from 1 day to 1 week, from 1 week to 1 month, from 5 minutes to 1 hour, from 1 hour to 6 hours, from 6 hours to 1 day, from 1 day to 4 days, from 4 days to 1 week, from 1 week to 2 weeks, from 2 weeks to 1 month, or from 5 minutes to 1 week).

The methods further comprise contacting the impregnated precursor composite material with a reducing agent, thereby reducing the metal salt to form a plurality of metal particles dispersed on the chitin substrate and forming the metal particle-chitin composite material. The reducing agent can, for example, comprise a borate buffer, borohydride, citrate, ascorbic acid, amino acid, surfactant, or a combination thereof.

Contacting the impregnated precursor composite material with the reducing agent can, for example, comprise immersing the impregnated precursor composite material in a solution comprising the reducing agent. The concentration of the reducing agent in the solution can, for example, be 1 micro molar ($\mu$M) or more (e.g., 5 $\mu$M or more, 10 $\mu$M or more, 15 $\mu$M or more, M or more, 30 $\mu$M or more, 40 $\mu$M or more, 50 $\mu$M or more, 75 $\mu$M or more, 100 $\mu$M or more, 125 $\mu$M or more, 150 $\mu$M or more, 200 $\mu$M or more, 250 $\mu$M or more, 300 $\mu$M or more, 400 $\mu$M or more, 500 $\mu$M or more, 750 $\mu$M or more, 1 milimolar (mM) or more, 2 mM or more, 3 mM or more, 4 mM or more, 5 mM or more, 10 mM or more, 15 mM or more, 20 mM or more, 30 mM or more, 40 mM or more, 50 mM or more, 75 mM or more, 100 mM or more, 125 mM or more, 150 mM or more, 200 mM or more, 250 mM or more, 300 mM or more, 400 mM or more, 500 mM or more, 750 mM or more, 1 molar (M) or more, 2 M or more, 3 M or more, 4 M or more, 5 M or more, 6 M or more, 7 M or more, 8 M or more, or 9 M or more). In some examples, the concentration of the reducing agent in the solution can be 10 M or less (e.g., 9 M or less, 8 M or less, 7 M or less, 6 M or less, 5 M or less, 4 M or less, 3 M or less, 2 M or less, 1 M or less, 750 mM or less, 500 mM or less, 400 mM or less, 300 mM or less, 250 mM or less, 200 mM or less, 150 mM or less, 125 mM or less, 100 mM or less, 75 mM or less, 50 mM or less, 40 mM or less, 30 mM or less, 20 mM or less, 15 mM or less, 10 mM or less, 5 mM or less, 4 mM or less, 3 mM or less, 2 mM or less, 1 mM or less, 750 µM or less, 500 µM or less, 400 µM or less, 300 µM or less, 250 µM or less, 200 LM or less, 150 µM or less, 125 µM or less, 100 µM or less, 75 µM or less, 50 µM or less, 40 µM or less, 30 µM or less, 20 µM or less, 15 µM or less, 10 µM or less, or 5 µM or less). The concentration of the reducing agent in the solution can range from any of the minimum values described above to any of the maximum values described above. For example, the concentration of the reducing agent in the solution can be from 1 µM to 10 M (e.g., from 1 µM to 1 mM, from 1 mM to 10 M, from 1 µM to 500 µM, from 500 M to 1 mM, from 1 mM to 50 mM, from 50 mM to 100 mM, from 100 mM to 500 mM, from 500 mM to 1 M, from 1 M to 10 M, or from 500 µM to 500 mM).

In some examples, the impregnated precursor composite material is contacted with the reducing agent at a temperature of 0° C. or more (e.g., 5° C. or more, 10° C. or more, 15° C. or more, 20° C. or more, 25° C. or more, 30° C. or more, 35° C. or more, 40° C. or more, 45° C. or more, 50° C. or more, 55° C. or more, 60° C. or more, 65° C. or more, 70° C. or more, 75° C. or more, 80° C. or more, 85° C. or more, 90° C. or more, or 95° C. or more). In some examples, the impregnated precursor composite material is contacted with the reducing agent at a temperature of 100° C. or less (e.g., 95° C. or less, 90° C. or less, 85° C. or less, 80° C. or less, 75° C. or less, 70° C. or less, 65° C. or less, 60° C. or less, 55° C. or less, 50° C. or less, 45° C. or less, 40° C. or less, 35° C. or less, 30° C. or less, 25° C. or less, 20° C. or less, 15° C. or less, 10° C. or less, or 5° C. or less). The temperature at which the impregnated precursor composite material is contacted with the reducing agent can range from any of the minimum values described above to any of the maximum values described above. For example, the impregnated precursor composite material is contacted with the reducing agent at a temperature of from 0° C. to 100° C. (e.g., from 0° C. to 50° C., from 50° C. to 100° C., from 0° C. to 20° C., from 20° C. to 40° C., from 40° C. to 60° C., from 60° C. to 80° C., from 80° C. to 100° C., or from 20° C. to 80° C.).

In some examples, the impregnated precursor composite material is contacted with the reducing agent for an amount of time 1 minute or more (e.g., 2 minutes or more, 3 minutes or more, 4 minutes or more, 5 minutes or more, 10 minutes or more, 15 minutes or more, 30 minutes or more, 45 minutes or more, 1 hour or more, 1.5 hours or more, 2 hours or more, 3 hours or more, 4 hours or more, 5 hours or more, 6 hours or more, 12 hours or more, 18 hours or more, 1 day or more, 1.5 days or more, 2 days or more, 3 days or more, 4 days or more, 5 days or more, 6 days or more, 1 week or more, 2 weeks or more, or 3 weeks or more). In some examples, the impregnated precursor composite material is contacted with the reducing agent for an amount of time of 1 month or less (e.g., 3 weeks or less, 2 weeks or less, 1 week or less, 6 days or less, 5 days or less, 4 days or less, 3 days or less, 2 days or less, 1.5 days or less, 1 day or less, 18 hours or less, 12 hours or less, 6 hours or less, 5 hours or less, 4 hours or less, 3 hours or less, 2 hours or less, 1.5 hours or less, 1 hour or less, 45 minutes or less, 30 minutes or less, 15 minutes or less, 10 minutes or less, 5 minutes or less, 4 minutes or less, 3 minutes or less, or 2 minutes or less). The time for which the impregnated precursor composite material is contacted with the reducing agent can range from any of the minimum values described above to any of the maximum values described above. For example, the impregnated precursor composite material is contacted with the reducing agent for an amount of time of from 1 minute to 1 month (e.g., from 1 minute to 1 day, from 1 day to 1 week, from 1 week to 1 month, from 5 minutes to 1 hour, from 1 hour to 6 hours, from 6 hours to 1 day, from 1 day to 4 days, from 4 days to 1 week, from 1 week to 2 weeks, from 2 weeks to 1 month, or from 5 minutes to 1 week).

The plurality of metal particles can, for example, comprise a metal selected from the group consisting of Ag. Au, Pd, Pt, Cu. Fe, Ni, Co, or combinations thereof. In some examples, the plurality of metal particles comprise a single metal. In some examples, the plurality of metal particles comprise a mixture of two metals (e.g., a plurality of bimetallic particles). Examples of bimetallic particles include, but are not limited to, Au/Pd, Au/Ag, Pt/Pd. Pt/Au, and Pd, Ag.

The plurality of metal particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

The plurality of metal particles can, for example, have an average particle size of 1 nm or more (e.g., 2 nm or more, 3 nm or more, 4 nm or more, 5 nm or more, 6 nm or more, 7 nm or more, 8 nm or more, 9 nm or more, 10 nm or more, 11 nm or more, 12 nm or more, 13 nm or more, 14 nm or more, 15 nm or more, 20 nm or more, 25 nm or more, 30 nm or more, 35 nm or more, 40 nm or more, or 45 nm or more). In some examples, the plurality of metal particles can have an average particle size of 50 nm or less (e.g., 45 nm or less, 40 nm or less, 35 nm or less, 30 nm or less, 25 nm or less, 20 nm or less, 15 nm or less, 14 nm or less, 13 nm or less, 12 nm or less, 11 nm or less, 10 nm or less, 9 nm or less, 8 nm or less, 7 nm or less, 6 nm or less, 5 nm or less, 4 nm or less, 3 nm or less, or 2 nm or less). The average particle size of the plurality of metal particles can range from any of the minimum values described above to any of the maximum values described above. For example, the plurality of metal particles can have an average particle size of from 1 nm to 50 nm (e.g., from 1 nm to 25 nm, from 25 nm to 50 nm, from 1 nm to 10 nm, from 10 nm to 20 nm, from 20 nm to 30 nm, from 30 nm to 40 nm, from 40 nm to 50 nm, from 1 nm to 5 nm, or from 5 nm to 40 nm).

In some examples, the plurality of metal particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the mean particle size (e.g., within 20% of the mean particle size, within 15% of the mean particle size, within 10% of the mean particle size, or within 5% of the mean particle size).

The plurality of metal particles can comprise particles of any shape (e.g., a sphere, a rod, a quadrilateral, an ellipse, a triangle, a polygon, etc.). In some examples, the plurality of metal particles can have an isotropic shape. In some examples, the plurality of metal particles are substantially spherical.

In some examples, the metal particle-chitin composite material can comprise the plurality of metal particles in an amount of 0.1 wt % or more (e.g., 1 wt % or more, 2 wt % b or more, 3 wt % or more, 4 wt % or more, 5 wt % or more, 10 wt % or more, 15 wt % or more, 20 wt % or more, 25 wt % or more, 30 wt % or more, 35 wt % or more, 40 wt % or more, or 45 wt % or more). In some examples, the metal particle-chitin composite material can comprise the plurality of metal particles in an amount of 50 wt % or less (e.g., 45 wt % or less, 40 wt % or less, 35 wt % or less, 30 wt % or less, 25 wt % or less, 20 wt % or less, 15 wt % or less, 10 wt % or less, 5 wt % or less, 4 wt % or less, 3 wt % or less, 2 wt % or less, or 1 wt % or less). The amount of the plurality of metal particles present in the metal particle-chitin composite material can range from any of the minimum values described above to any of the maximum values described above. For example, the metal particle-chitin composite material can comprise the plurality of metal particles in an amount of from 0.1 wt % to 50 wt % (e.g., from 0.1 wt % to 25 wt %, from 25 wt % to 50 wt %, from 0.1 wt % to 10 wt %, from 10 wt % to 20 wt %, from 20 wt % to 30 wt %, from 30 wt % to 40 wt %, from 40 wt % to 50 wt %, or from 5 wt % to 45 wt %). In some examples, the plurality of metal particles can be substantially homogeneously dispersed throughout the metal particle-chitin composite material.

Also disclosed herein are compositions comprising the metal particle-chitin composite materials made by any of the methods described herein.

Also disclosed herein are articles of manufacture comprising the metal particle-chitin composite materials made by any of the methods described herein. Examples of articles of manufacture include, for example, supported catalysts, optical materials, magnetic materials, and coatings.

Also disclosed herein are catalysts comprising the metal particle-chitin composite materials made by any of the methods described herein. Also disclosed herein are methods of use of the catalysts, the catalyst being used to catalyze a coupling reaction. Examples of coupling reactions include, but are not limited to the Sonogashira reaction and the Suzuki Reaction. Also disclosed herein are methods of use of the catalysts, the catalyst being used to catalyze a hydrosilation, reduction/oxidation, cyclization, or hydrogenation reaction

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The metal salts of potassium tetrachloroaurate(II) (98%), sodium tetrachloroplatinate (II) hydrate (99.95%), and sodium tetrachloropalladate(II) (~36% Pd) were purchased from Fisher. Silver nitrate (≥99%), bromobenzene (99%), and phenylboronic acid (95%) were purchased from Sigma-Aldrich and used without further purification. Borate buffer solution pH=10 (Acros Organics), anhydrous potassium carbonate (99%), were received from Fisher. Ethanol (95%) and dichloromethane (≥99.5° %) were obtained from Fisher and used as received. Deionized (DI) water was obtained from a commercial deionizer (Culligan, Northbrook, Ill., USA) with specific resistivity of 16.82 MΩ·cm at 25° C. The ionic liquid, 1-ethyl-3-methylimidazolium acetate ([$C_2$mim][OAc], purity >95%) was purchased from IoLiTec. Inc. (Tuscaloosa, Ala., USA).

Solutions of shrimp shell extract was prepared accordingly to a previously published procedure. Briefly, shrimp shells (2 wt %) in [Emim][OAc] were prepared by heating using microwave irradiation with 2 sec pulses with manual stirring during 6 min. For the first 30 sec, the heating was done in 10 sec pulses. After the desired microwave time was reached, the solution was transferred into centrifuge tubes and centrifuged at 3000 rpm for 20 min to remove undissolved residues. Centrifuged solutions were poured into tubes (decanted from a residue remained after centrifugation) and were used for obtaining regenerated chitin.

The shrimp shell solution of processed biomass (decanted from the residues) as obtained above (60 g for each coagulation) was coagulated in 1 L of deionized water (DI) during constant stirring and left overnight to remove ionic liquid from coagulated chitin. The chitin obtained was transferred into centrifuge tubes to remove any remaining aqueous phase. Fresh DI water was added, followed by sonication and then centrifugation at 3000 rpm for 15 min. The steps were repeated 10 times. Regenerated chitin was oven dried at 60° C. The regenerated chitin was ground using an electric lab mill (Model M20 S3, IKA™. Wilmington, N.C.) and sieved through a set of four (1000 μm, 500 μm, 250 m, and 125 μm) brass sieves with wire mesh (Ika Labortechnik, Wilmington, N.C.) to obtain chitin particles <125 μm in size.

Solutions of shrimp shell and regenerated chitin were electrospun from a custom-built electrospinning system equipped with a multi-needle spinneret. Briefly, 50 g chitin solutions in ionic liquid were loaded into a feeding flask directly connected to the spinneret. The spinneret was connected to the high voltage power supply (UltraVolt, USA). The operating voltage was 25-26 kV and solution flow was controlled by gravity in a typical electrospinning experiment. To test the nanoparticle reductions, a solution of shrimp shell chitin at 0.23 wt % and 0.5 wt % regenerated chitin were used for electrospinning. The solutions were electrospun into a coagulation bath filled with deionized (DI) water. The distance between the tips of the needles and coagulation bath was 9.5 cm. Electrospinning was performed at room temperature. The ionic liquid was removed from the coagulated mats by keeping the mats in pure deionized water. The electrospun mats were then air-dried on porous Teflon coated mesh (100 Mesh T304 Stainless 0.0045" Wire Dia. Green PTFE, Part #100X100S0045W36_PTFE. TVP Inc., Berkeley, Calif., USA).

To deacetylate, the chitin nanomat was placed in 400 mL of 1.25 M NaOH at 80° C. for six hours. The deacetylated nanomat was then moved into a deionized (DI) water bath, and the DI water was replaced until the pH reached 7. The deacetylated nanomat was then removed from the DI water bath, washed with acidified DI water (pH adjusted to 2 with 0.1 M HCl). The washed deacetylated chitin substrate then used as the substrate for nanoparticles synthesis.

Figure 2:
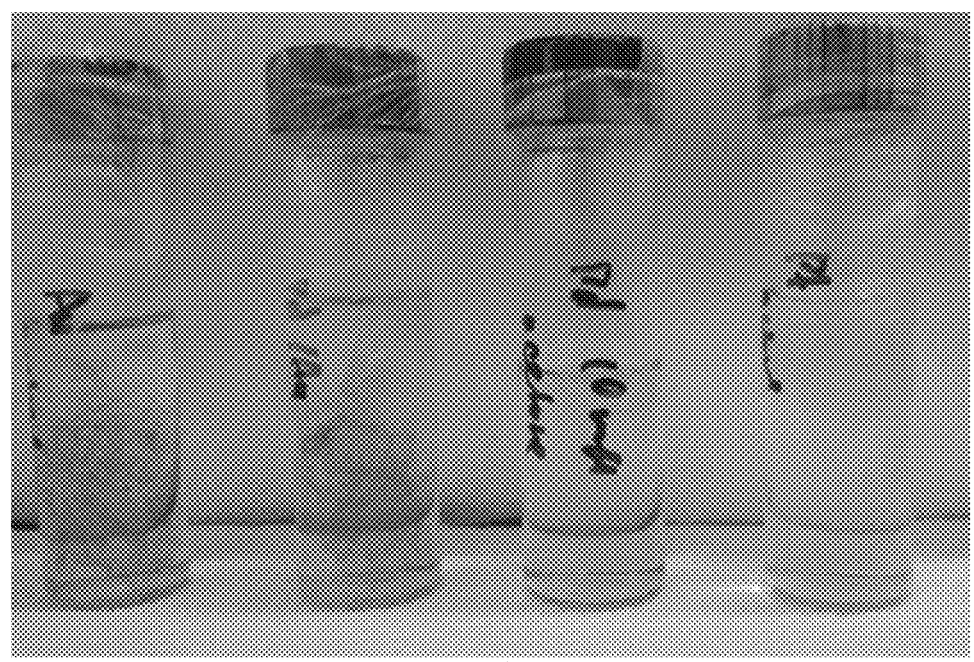
FIG. 2 shows photographs of the metal nanoparticle-chitin mats: starting from left to right are Au nanoparticle-chitin, Pd/Au nanoparticle-chitin, Pd nanoparticle chitin and Pt nanoparticle-chitin.

Water soluble salts of Pd(II), Au (III), Ag(I), and Pt(II) were used as precursors for nanoparticle formation. The salt concentration used for saturation of the deacetylated chitin mat was 10 mM and 1 mM. Borate buffer was chosen as a mild reducing agent (Kozlovskaya V et al. *Chem. Mater.* 2009, 21, 2158-2167). The deacetylated chitin mats were placed in the salt solution at pH=2 and left for 72 h in the dark to allow complete surface saturation of the deacetylated chitin surface with metal ions (FIG. 1). After 72 h, the nanomat was washed with deionized water with its pH adjusted to 2 using 0.1 M HCl to remove any unattached ions from the nanomat. The washed chitin mats were placed in the solution of borate buffer at pH=10 (Fisher) and left for 11 days in the dark to reduce the adsorbed metal ions. After the reduction, the composite chitin mats had different colors, depending on type of metal precursor (FIG. 2). The nanomats with formed nanoparticles were then washed with water with a pH=2 (adjusted with 0.1 M HCl) and kept in deionized water for further use and characterization. The formation of nanoparticles in chitin network and their size distribution was confirmed with UV-vis spectroscopy and transmission electron microscopy (TEM), respectively.

The bimetallic nanoparticles were synthesized using the procedure similar to that for single metal nanoparticles with exception of using aqueous solutions of two metal salts in different molar ratios. To prepare bimetallic nanoparticles, mixtures of Pd/Au, Au/Pt, etc. at 5/5 mM ratio was used. The formation of bimetallic nanoparticles was confirmed with UV-vis spectroscopy, TEM and (Energy Dispersive X-ray Spectroscopy) (EDS).

The Suzuki coupling reaction was performed in an ethanol/water mixture (3 mL, 2:1 ethanol/water). The reagents were added into the ethanol/water solvent mixture with added Pd-chitin catalyst in the following ratio: 0.5 mmol of Bromobenzene, 0.75 mmol phenylboronic acid and 1 mmol of $K_2CO_3$. The reaction mixture was heated to 70° C. and kept at this temperature for 12 h. The products were separated from reaction mixture by extraction with dichloromethane (3 mL of dichloromethane was added to form biphasic system). The aliquot was taken from the bottom layer and was additionally diluted with 4-5 mL of dichloromethane for analysis with GC-MS.

Gas Chromatography—Mass Spectrometry (GC-MS) was performed using Waters Autospec NT mass spectrometer with GC (HP6890) inlet (Waters, Milford, Mass.). GC-MS run conditions: starting temperature of 50° C. and a hold time of 1 min, a ramp rate of 10° C. $min^{-1}$, and a final temperature of 200° C., with a hold time of 10 min; Zebron ZB-5MS column (30 m length, 250 μm internal diameter, column coating thickness of 25 μm), EI source temperature 220° C. The samples used for analysis were dissolved in dichloromethane.

Transmission electron microscopy (TEM) was used for the determination of particle sizes and size distributions. The nanoparticle-chitin mats were oven-dried and ground into small sized particles prior to deposition on the TEM grid. The ground nanoparticle-chitin samples were deposited from ethanol onto carbon coated copper TEM grids (Ultra-thin C Film on Holey Carbon Support Film. 400 mesh, Ted Pella, Inc.). The air-dried TEM samples were imaged with a Technai 20 TEM equipped with an EDX detector. Operating voltage was 200 kV.

The Ultraviolet—Visible spectroscopy (UV-Vis) measurements were performed on metal nanoparticle-chitin mats air-dried on quartz slides (0.8×2.2 cm) using Lambda XLS (PerkinElmer) UV-vis spectrometer. The quartz slides were placed inside 1×1 cm quartz cuvettes and the UV-Vis spectra were collected over a range from 800 nm to 200 nm. The UV-Vis spectra of salt solutions were taken using quartz cuvettes (1×1 cm) over a wavelength range of from 800 nm to 200 nm.

Example 1

There are a variety of naturally-derived biopolymers that can be used to support metal nanoparticles. Similar to their synthetic analogs, biopolymer supported nanoparticles showed good catalytic activity for industrial reactions, including the Suzuki, Heck, and Sonogashira coupling reactions (Perignon N et al. *Chem. Mater.* 2004, 16, 4856-4858; Hardy J J E et al. *Green Chem.* 2004, 6, 53-56; Reddy K R et al. *Journal of Molecular Catalysis A: Chemical* 2006, 252, 12-16). Chitin is the second most abundant biopolymer, second only to cellulose, and chitin has remarkable mechanical properties, low toxicity, and functional groups suitable for surface modification. Chitin it is not soluble in water nor in most known organic solvents, making it a potential universal support for catalyzing reactions different classes of reactions (Muzzarelli R A A. *Mar.* Drugs 2011, 9, 1510-1533). Despite its poor solubility in organic solvents, chitin can be solubilized in ionic liquids (ILs, salts that are liquid below 100° C.) (Qin Y et al. *Green Chem.* 2010, 12, 968-971). Furthermore, high molecular weight chitin can be extracted directly from the shells of crustaceans and can be processed into functional materials of different shapes and sizes with the aid of ionic liquids. For example, chitin can be wet-jet spun from ionic liquids to form fibers with controllable fiber diameter, cast into films from ionic liquids, and formed into beads from ionic liquids (Durkin D P et al. *ACS Sustainable Chem. Eng.* 2016, 4, 5511-5522; Reddy K R et al. *Journal of Molecular Catalysis A: Chemical* 2006, 252, 12-16; King C et al. *Green Chem.* 2016, DOI: 10.1039/C6GC02201D; Shamshina J L et al. *J. Mater. Chem. B* 2014, 2, 3924-3936). It is also possible to electrospin nanofibers from chitin solutions in ionic liquids (Shamshina J L et al. *ChemSusChem,* 2016 DOI: 10.1002/cssc.201601372).

From a catalysis prospective, bimetallic nanoparticles (e.g., nanoparticles that have two different metals in the structure) are more interesting than monometallic nanoparticles due to the possibility of synergistic effects between the two different metals during catalysis. Various methods have been reported for the synthesis of single- and bimetallic nanoparticles on solid templates, which include deposition precipitation, co-precipitation, and $H_2$ or $N_2$ thermal reduction, which might lead to nanoparticles sintering and aggregating, depending on the substrate (Pachón L D and Rothenberg G. *Applied Organometallic Chemistry* 2008, 22, 288-299; Guo S and Wang E. *Nano Today* 2001, 6, 240-264). Alternatively, application of in situ synthesis of metal nanoparticles in the confined environment of a polymeric support can provide better control over the nanoparticles size, morphology, and shape (Kozlovskaya V et al. *Chem. Mater.*

2009, 21, 2158-2167; Lee D et al. *Chem. Mater.* 2005, 17, 1099-1105; Wang T C et al. *Langmuir* 2002, 18, 3370-3375).

Described herein are methods of making mono- and bi-metal nanoparticles supported with biopolymers and processed into a variety of forms including beads, fibers, films, and electrospun networks. In contrast to borohydride reducing agents used in vast majority of in situ nanoparticles synthesis, the methods described herein employ mild reducing conditions that can provide better control over nanoparticle size. The catalytic properties of the supported nanoparticle composites were also investigated for catalyzing Suzuki coupling reactions.

Chitin-based materials were investigated as supports for different types of mono- and bimetal nanoparticles, by synthesizing nanoparticles via in situ reduction. Chitin supports were prepared by electrospinning solutions of shrimp shells or regenerated chitin from 1-ethyl-3-methylimidazolium acetate ([$C_2$mim][OAc]) ionic liquid (IL). For this, solutions of shrimp shell extract were first prepared according to a previously reported procedure (Durkin D P et al. *ACS Sustainable Chem. Eng.* 2016, 4, 5511-5522). To reach a chitin concentration suitable for electrospinning (0.23-0.40 wt %), the shrimp shell extract solutions were diluted with fresh ionic liquid followed by overnight stirring at 50° C. Similarly, the regenerated chitin solutions (0.5 wt %) were prepared by thermal dissolution of chitin powder in an ionic liquid at 90° C. overnight, under constant stirring (Yilmaz E et al. *Carbohydr. Polym.* 2003, 54, 479-488). All chitin solutions were electrospun at room temperature to form chitin networks and used as a template for nanoparticles synthesis.

Synthesis of Pd-Supported Catalyst

To prepare Pd nanoparticles supported on the chitin mat, a water soluble salt of sodium tetrachloropalladate(I) was used as a precursor for Pd nanoparticle formation. The deacetylated chitin mats (3 g, wet weight) were placed in the Pd metal salt solution (10 mL, 10 mM) at pH=2 (salt solutions were dissolved in the pH=2 water prepared using 0.1 M HCl) and left for 72 h in the dark to saturate the surface of the deacetylated chitin nanomat with metal ions. After 72 h, the deacetylated chitin nanomat was washed with DI water (pH=2). The washed chitin mats were placed in a solution of borate buffer (15 mL) at pH=10 (Fisher) and left for 11 days in the dark to reduce the metal salt and form the metal nanoparticles. The nanomats with the formed nanoparticles were removed from the borate buffer and washed with acidic water (pH adjusted to 2 with HCl) followed by washing with DI water before further use and characterization. The composite nanoparticle-chitin mats were stored in ethanol (95% ethanol) for long periods of time.

Figure 3:
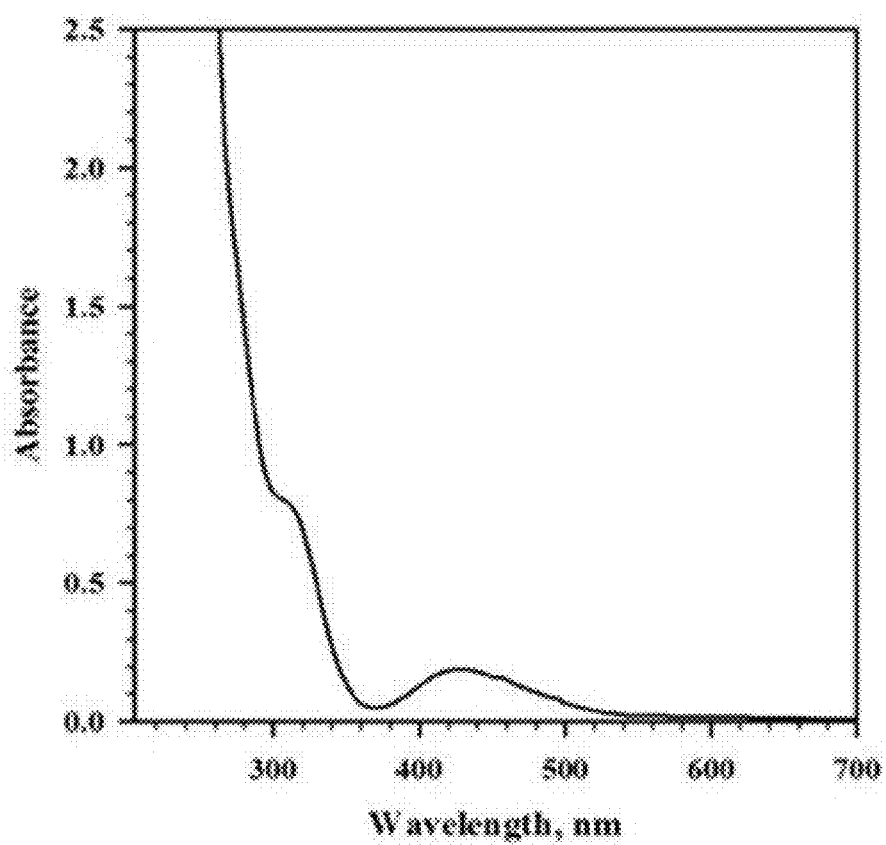
FIG. 3 is a UV-vis spectrum of a solution of Pd (II) salt.
Figure 4:
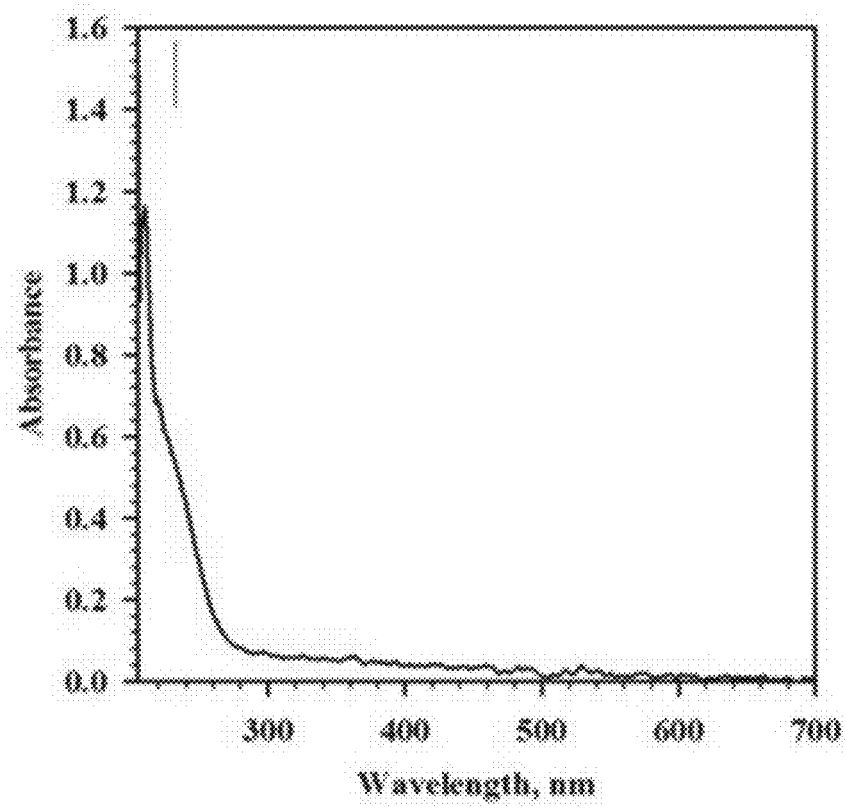
FIG. 4 is a UV-vis spectrum of a Pd nanoparticle-chitin mat after the borate buffer reduction.
Figure 5:
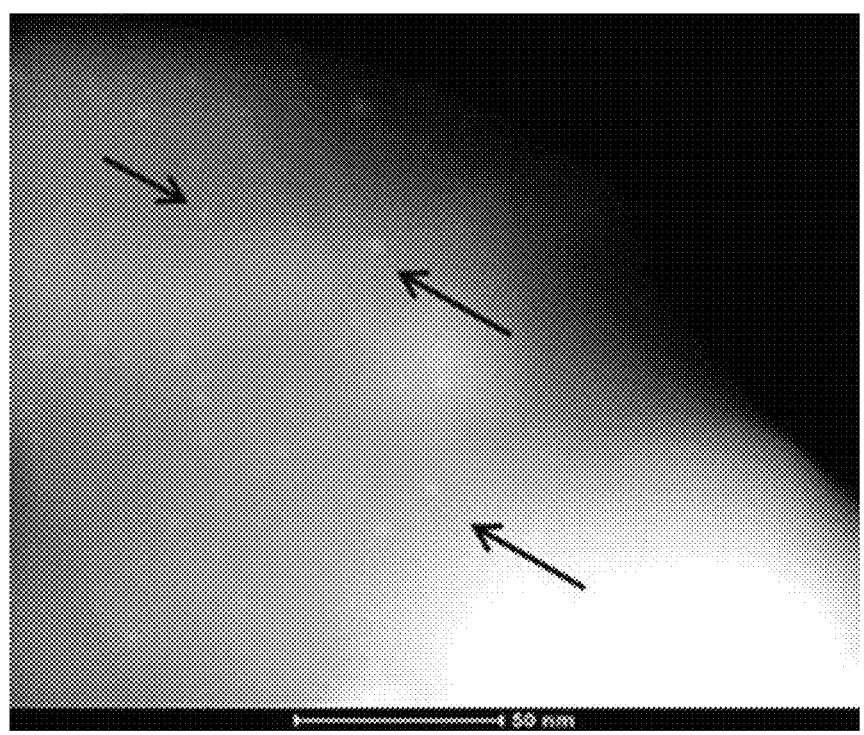
FIG. 5 is a scanning transmission electron microscopy (STEM) image of a Pd nanoparticle-chitin mat (average diameter of Pd nanoparticles 3.2±1 nm).
Figure 6:
FIG. 6 is a STEM image of a Pd nanoparticle-chitin mat (average diameter of Pd nanoparticles 3.2±1 nm).
Figure 7:
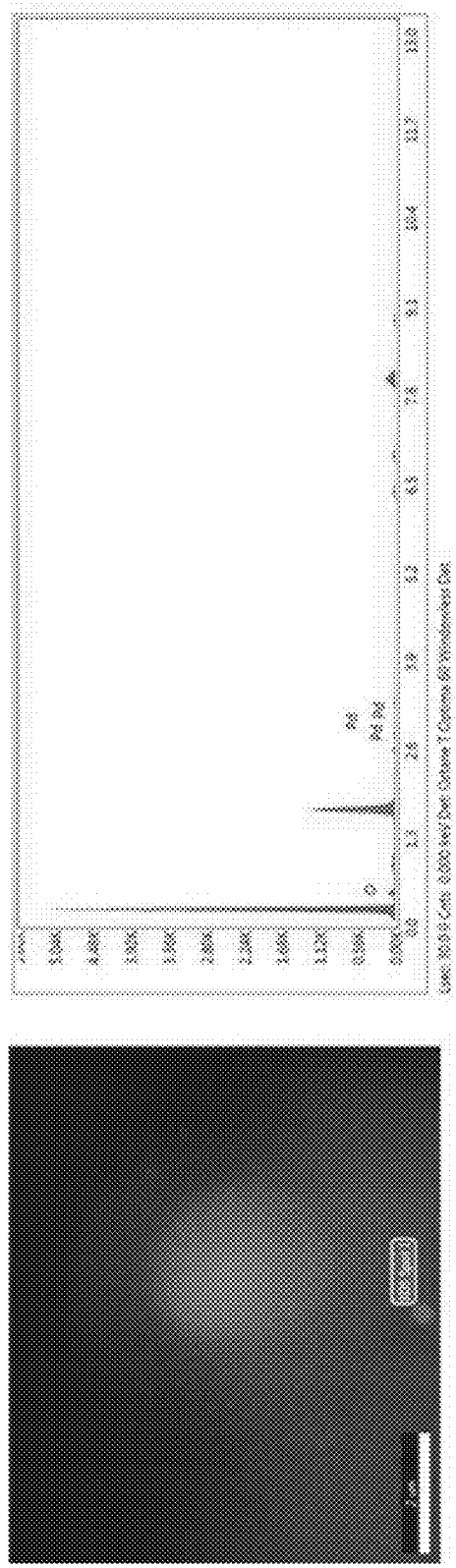
FIG. 7 shows the Energy-Dispersive X-ray Spectroscopy (EDS) spectrum of a Pd nanoparticle-chitin mat (for clarity, only oxygen and Pd peaks are labeled).

Reducing Pd(II) using borate buffer on deacetylated chitin substrate resulted in Pd nanoparticle (Pd(0)) formation, confirmed by the following analysis. Typical UV-Vis spectrum of $PdC_4$ (II) salt solutions at pH=2 is shown in FIG. 3, while the chitin mat after the Pd(II) reduction to Pd(0) nanoparticles is shown in FIG. 4. As seen, the peaks at ~420 nm that corresponded to the Pd(II) solution complex disappeared, indicating the complete reduction of Pd(II) to Pd(0). To additionally confirm the formation of Pd nanoparticles on chitin, scanning transmission electron microscopy (STEM) and Energy-Dispersive X-ray Spectroscopy (EDS) were performed on air-dried ground Pd nanoparticles-chitin mats. The STEM images of the Pd nanoparticles-chitin mats showed a large quantity of Pd nanoparticles on the chitin surface (FIG. 5 and FIG. 6) with the average diameter of the Pd nanoparticles being 3.2±1.0 nm. The EDS results also confirmed the presence of Pd nanoparticles (FIG. 7). The calculated weight % ratio between oxygen and Pd is 42.18/57.82, indicating presence of Pd. The copper peak seen in the EDS spectrum is coming from the TEM grid, the peaks seen for carbon and nitrogen are coming from chitin (for clarity, only oxygen and Pd peaks are labeled) (FIG. 7).

Example 2: Synthesis of Au-Supported Catalyst

Figure 8:
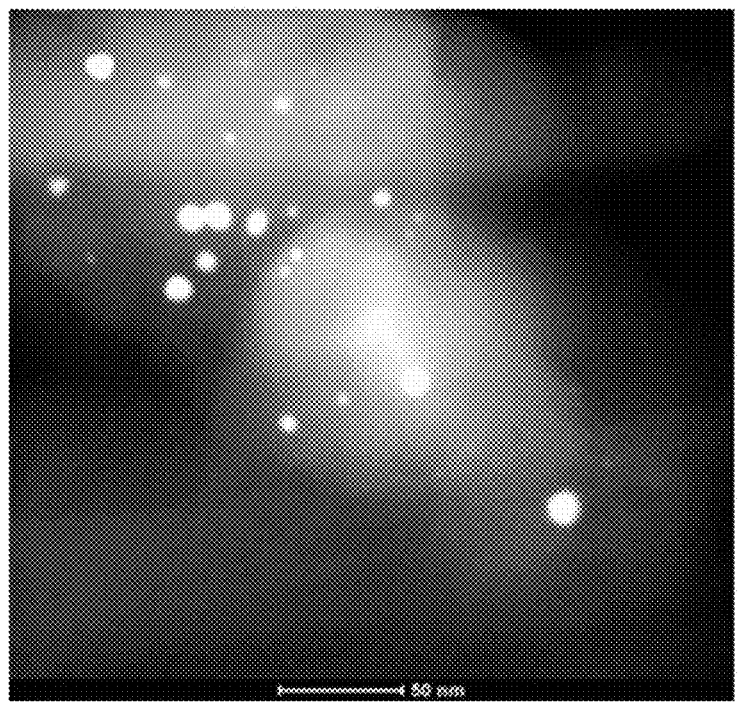
FIG. 8 is a STEM image of a Au nanoparticle-chitin mat deposited from an ethanol solution.
Figure 9:
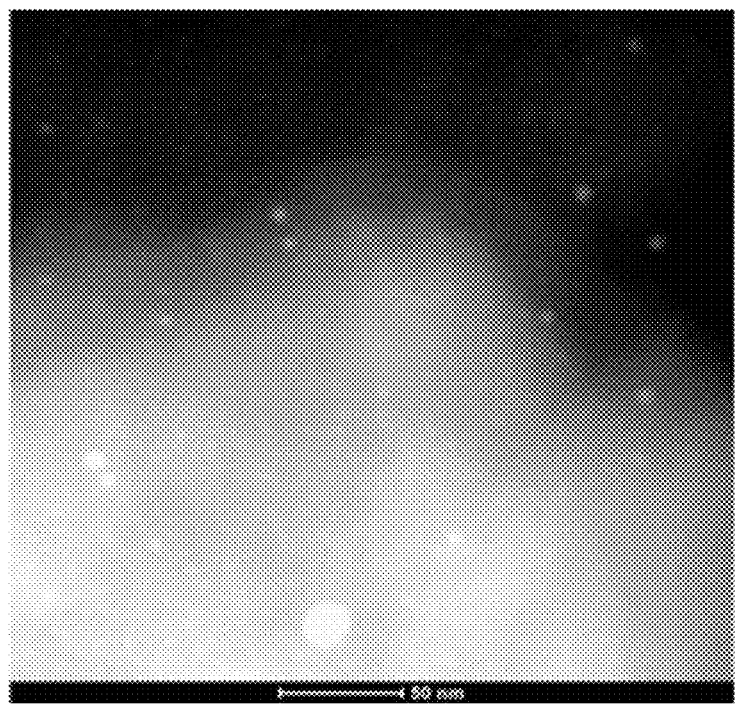
FIG. 9 is a STEM image of Au nanoparticle-chitin mat deposited from an ethanol solution.
Figure 10:
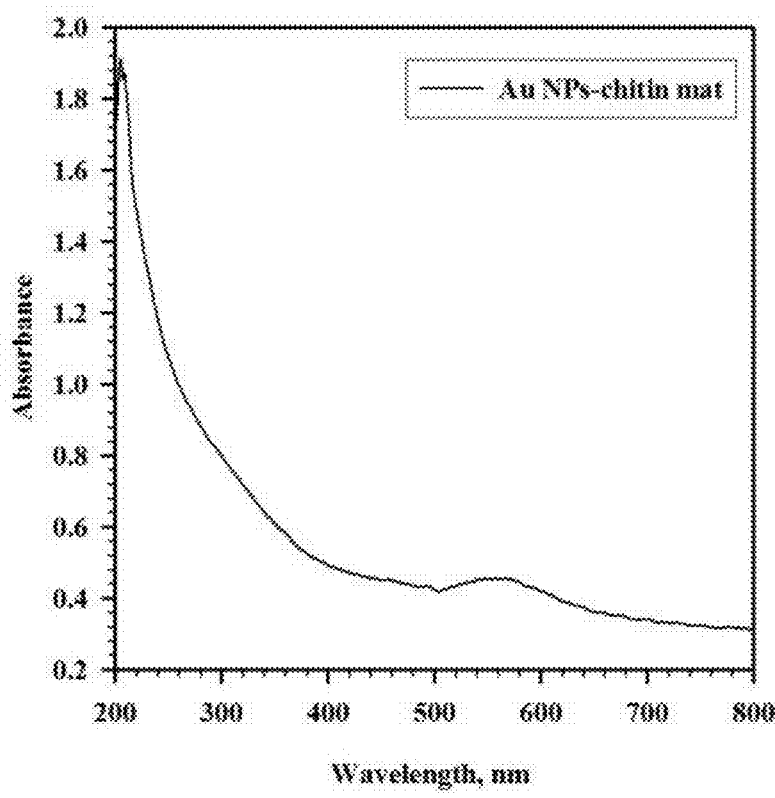
FIG. 10 is a UV-vis spectrum of air-dried a Au nanoparticle-chitin mat.

The synthesis of Au nanoparticles was conducted as described above, but with potassium tetrachloroaurate salt used as the precursor. The formation of Au nanoparticles was confirmed by STEM and UV-vis spectroscopy. The synthesized Au nanoparticles had an average dimeter of 6.4±2.6 nm (FIG. 8 and FIG. 9). The small size of synthesized Au nanoparticles was also confirmed from the UV-vis spectrum of the air-dried chitin nanomats with in situ reduced gold nanoparticles (FIG. 10). The peak seen at ~550-560 nm in the UV-Vis spectrum corresponds to gold nanoparticles (FIG. 10).

Example 3: Synthesis of Ag Nanoparticles-Supported Catalyst

Figure 11:
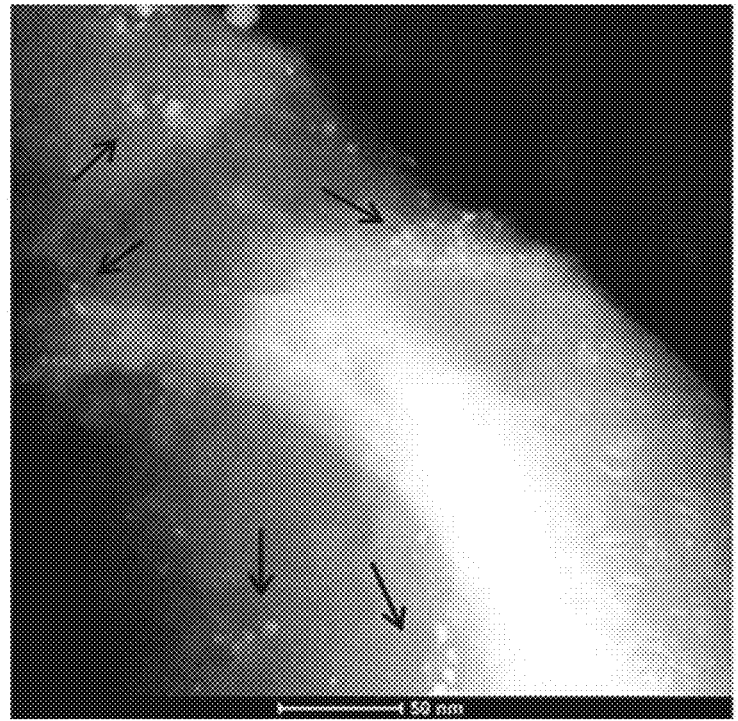
FIG. 11 is a STEM image of a Ag nanoparticle-chitin mat deposited from an ethanol solution.
Figure 12:
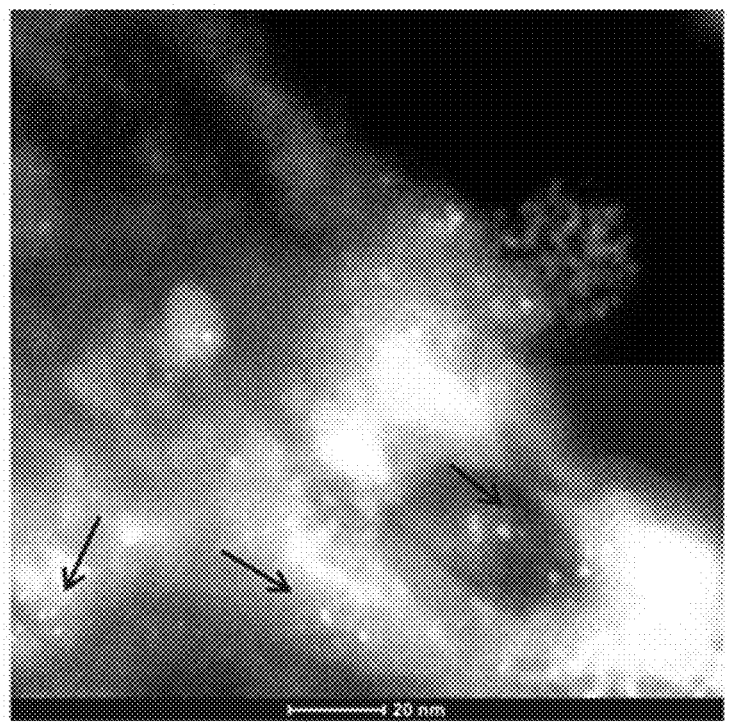
FIG. 12 is a STEM image of a Ag nanoparticle-chitin mats deposited from an ethanol solution.

Silver nanoparticles were synthesized using in situ reduction of silver nitrate with borate buffer at pH=10. The silver nitrate salt was directly dissolved in deionized (DI) water without of the pH adjustment to avoid the formation of insoluble silver chloride salt. The successful synthesis of Ag nanoparticles on the chitin mats was confirmed with STEM (FIG. 11 and FIG. 12). The calculated average diameter of the Ag nanoparticles was 2.6±1.2 nm (FIG. 11 and FIG. 12).

Example 4: Synthesis of Bimetallic Pd/Au Nanoparticles-Supported Catalyst

Figure 13:
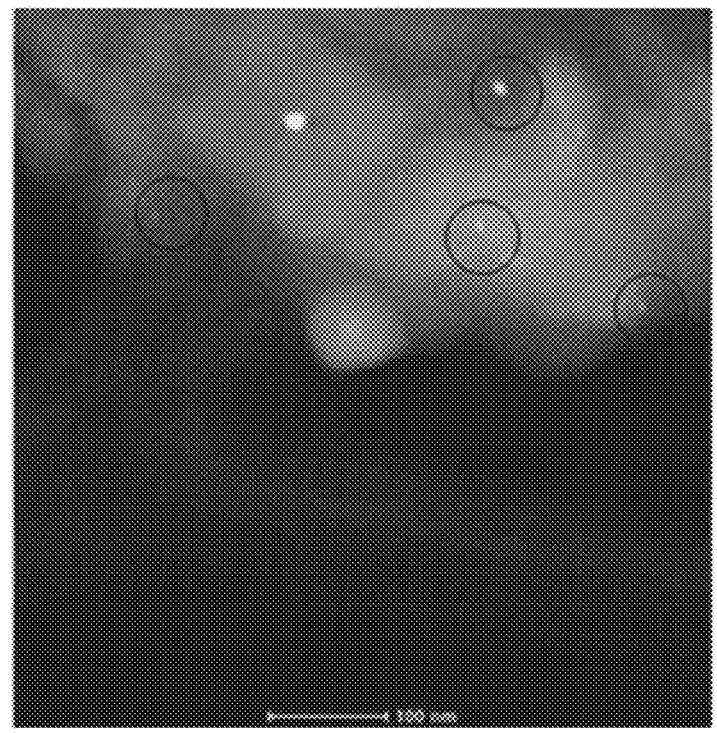
FIG. 13 is a STEM image of a bimetallic Au/Pd nanoparticle-chitin mat.
Figure 14:
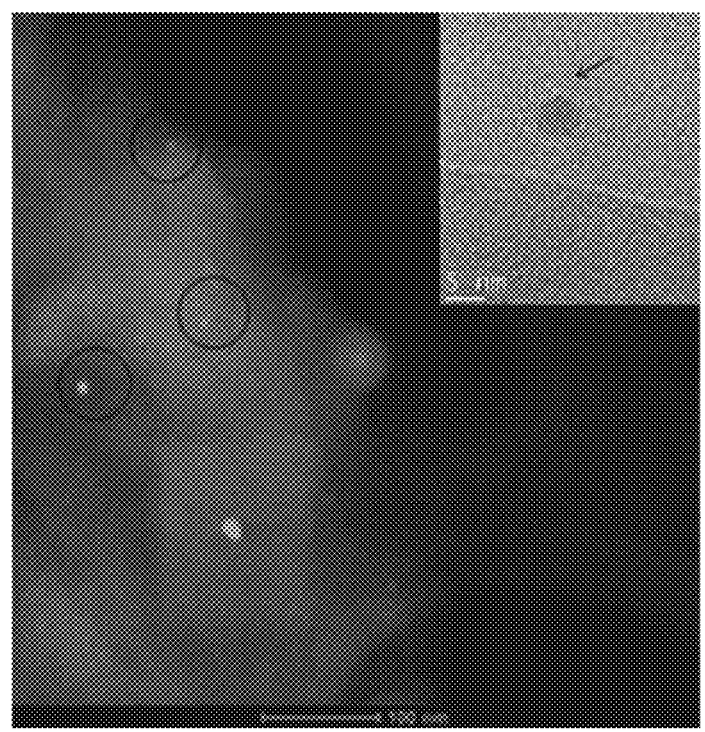
FIG. 14 is a STEM image of a bimetallic Au/Pd nanoparticle-chitin mat. Inset shows a TEM bright field image with the lattice structure of nanoparticles (5.8 nm).

A similar procedure to that described above was used for the synthesis of bimetallic Pd/Au nanoparticles, with the exception that a mixture of Pd(II) and Au(III) salts (5 mM/5 mM ratio) at pH=2 (adjusted with 0.1 M HCl) were used for the surface saturation of the deacetylated chitin materials, followed by in situ reduction with borate buffer. The formation of the Pd/Au nanoparticles was confirmed with STEM and UV-vis spectroscopy. The STEM images show that the average diameter of the synthesized Pd/Au nanoparticles was 5.8 nm (FIG. 13 and FIG. 14).

Figure 15:
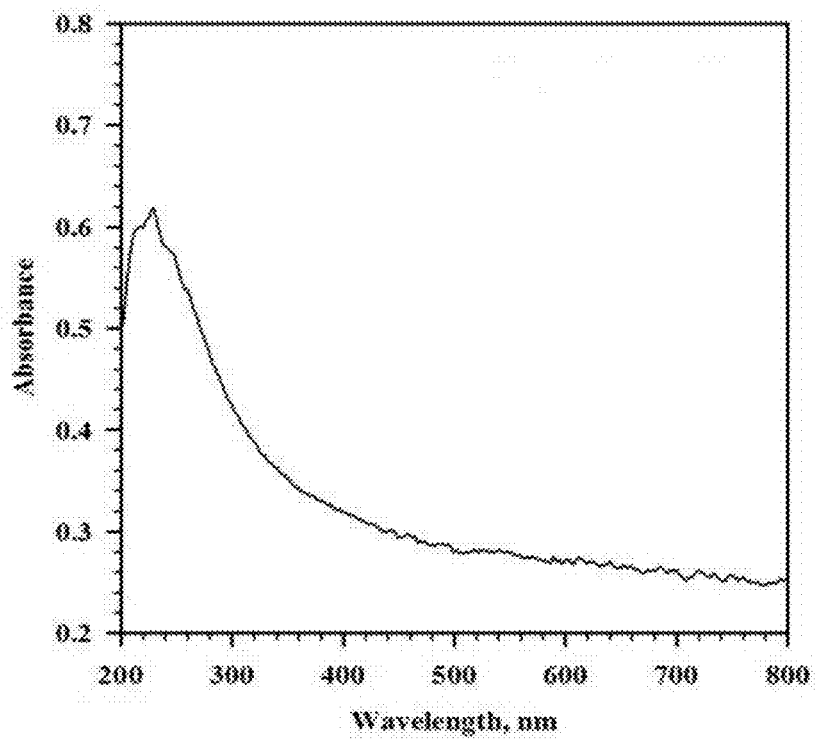
FIG. 15 is a UV-vis spectrum of an air-dried Au/Pd nanoparticle-chitin mat.

The FIG. 15 shows the UV-vis spectrum of air-dried chitin mat with bimetallic Pd/Au nanoparticles. As seen, there are no distinct peaks in the 500 to 600 nm region of the spectrum, indicting no formation of individual gold nanoparticles (FIG. 15). The region of the spectrum from 200 to 300 nm shows a peak at ~250 nm, shifted from ~210 nm as compared to single Pd nanoparticles (FIG. 3), indicating presence of gold in the nanoparticles (FIG. 15).

Example 5: Catalytic Activity of Metal Nanoparticles Supported with Chitin Networks The industrially applied Suzuki coupling for biphenyl synthesis was used to test the catalytic performance of the composite nanoparticle-chitin materials. The reaction is shown in Scheme 1. The Suzuki reaction allows for the preparation of intermediates for pharmaceutical industry or fine chemicals and is extensively used to synthesize polyolefins, styrene, and bisphenyls. Catalytic activity was tested using Pd nanoparticles supported on chitin and Pd/Au nanoparticles supported on chitin.

Scheme 1. Suzuki coupling reaction.

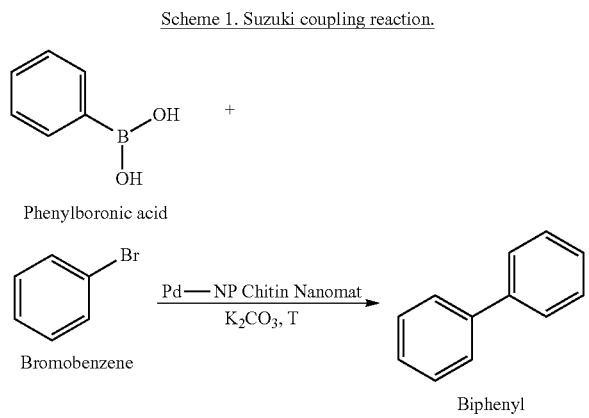

For the Suzuki coupling reaction used herein, bromobenzene (0.5 mmol), phenylboronic acid (0.75 mmol), and K$_2$CO$_3$ (1 mmol) were dissolved in a mixture of ethanol and deionized water. The catalyst was added into the reaction in an amount of 0.0078 or 0.01 mg of Pd nanoparticles. The reaction then proceeded for 12 h at 70° C., followed by product extraction and analysis using gas chromatography couple with mass spectrometry (GC-MS). The results of the reactions are summarized in Table 1.

TABLE 1

Product selectivity and degree of conversion obtained for the Suzuki reactions with different amount of catalyst.

| Catalyst | Amount of Pd or (Pd + Au) | Conversion of 1-bromobenzene (%) | Selectivity of biphenyl (%) |
| --- | --- | --- | --- |
| Pd nanoparticle-chitin mat | 0.0078 mg | 98.68 | 98.36 |
| Pd nanoparticle-chitin mat | 0.0110 mg | 100.0 | 100.0 |
| Pd/Au nanoparticle-chitin mat | | 85.64 | 98.30 |

As seen from Table 1, the Pd nanoparticle-chitin catalyst showed high catalytic activity with almost 100% conversion and selectivity towards the biphenyl product. A slightly lower conversion rate, but still with a high degree of selectivity, was observed for the bimetallic Pd/Au nanoparticle-chitin catalyst, which is expected based on the lower amount of Pd in the bimetallic Pd/Au nanoparticles relative to the pure Pd nanoparticles.

Example 6

The reduction conditions (pH of the media) of metal-ions can play a role on the efficiency of the conversion from Pd (II) to Pd (0), quality of nanoparticles attached to materials, and the size of formed nanoparticles. Therefore, the formation of Pd nanoparticles was investigated at acidic pH (pH 2) (sample 1, Table 2). For said tests, first, a solution of regenerated chitin at 0.5 wt % chitin in the ionic liquid 1-ethyl-3-methylimidazolium acetate ([C$_2$mim][OAc]) was electrospun to form an interconnected fiber network using the following electrospinning parameters: applied voltage of 33.5 kV and external air-pressure of 0.5-0.8 psi (Shamshina et al. *ChemSusChem* 2017, 10, 106.) The electrospun mat was collected on the water surface and washed to remove remaining ionic liquid, followed by surface deacetylation using 1.25 M NaOH for 6 h at 80° C.

After deacetylation, the chitin mat was washed thoroughly with deionized water (DI) water first, followed by washing with DI water adjusted to pH 2. The pH of DI water was adjusted by dropwise addition of 0.1 M HCl. After the washing, the mat was immersed into a solution of Pd(II) salt (sodium tetrachloropalladate(11)) at 0.5 mM, adjusted to pH 2 using 0.1 M HCl) and kept in the salt solution for 3 days (72 h). To remove unattached metal-ions, the mat was washed in DI water (pH 2) and immersed into borate buffer with pH 2. The mat was kept in borate buffer for 11 days. After the reduction, borate buffer and any remaining unreduced ions were washed using DI water (pH 2) and mat was freeze-dried for further characterization.

Figure 16:
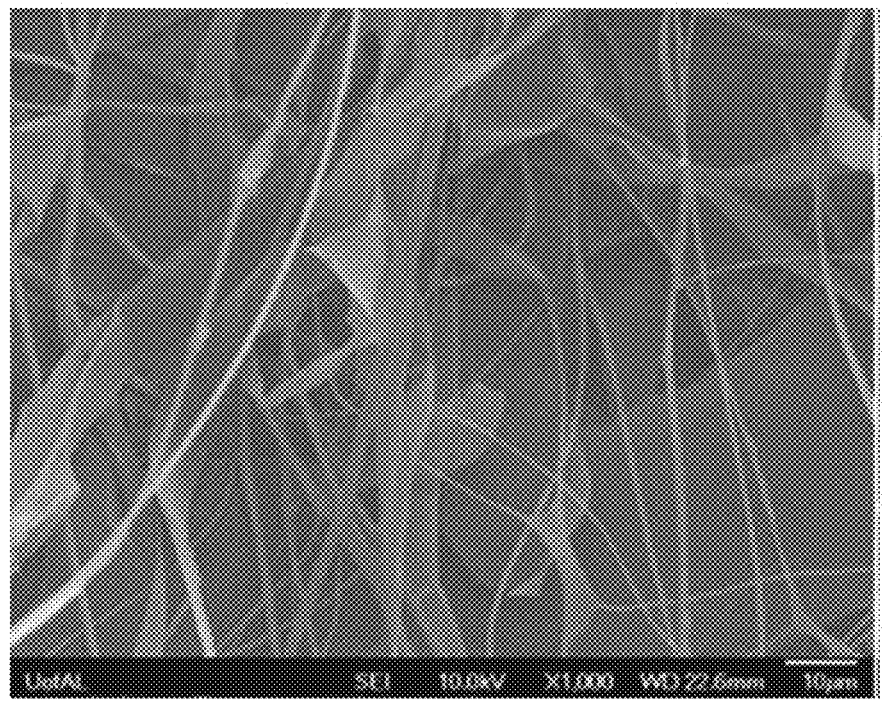
FIG. 16 is a SEM image of the electrospun chitin mat with in situ reduced Pd nanoparticles at ×1000 magnification.
Figure 17:
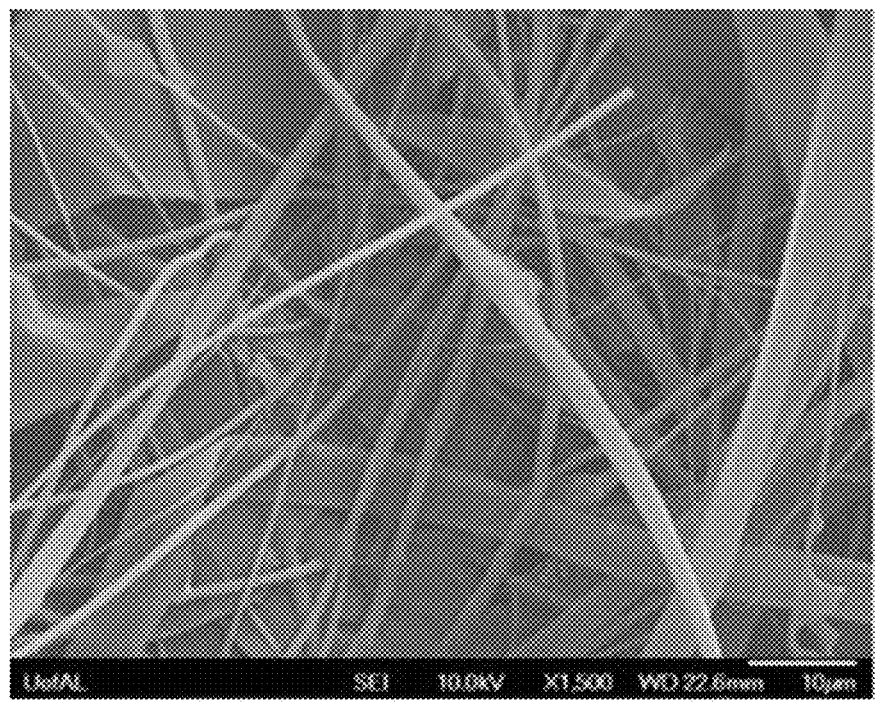
FIG. 17 is a SEM image of the electrospun chitin mat with in situ reduced Pd nanoparticles at ×1500 magnification.
Figure 18:
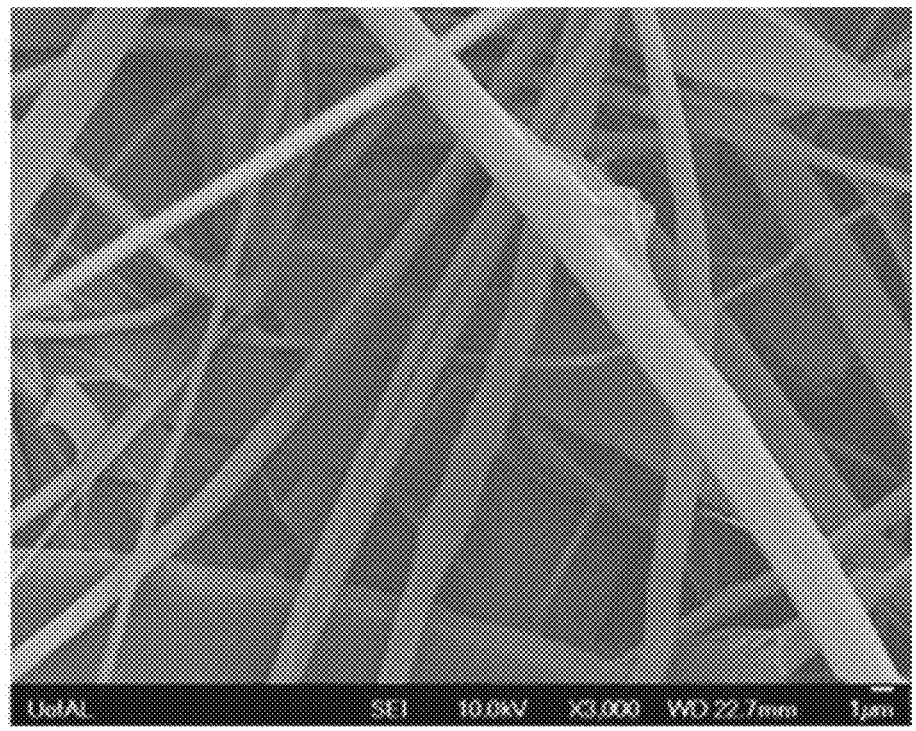
FIG. 18 is a SEM image of the electrospun chitin mat with in situ reduced Pd nanoparticles at ×3000 magnification.

To determine the morphology of the Pd-chitin catalyst, the mat was imaged using Scanning Electron Microscopy (SEM) (FIG. 16-FIG. 18).

The catalytic activity of Pd nanoparticles formed under acidic condition was tested with Suzuki reaction. Prior to investigating catalytic activity, the amount of Pd in chitin mat was determined gravimetrically (the amount of incorporated Pd was estimated to be 2 wt %).

To test the minimum amount of catalyst needed for 100% conversion, the catalyst was added to a reaction mixture comprising a solution of 0.5 mmol bromobenzene, 0.75 mmol of phenylboronic acid, and 1 mmol of K$_2$CO$_3$ in ethanol/deionized water (2:1 EtOH:water). The amount of catalyst added was 0.96 µg, 2.3 µg, 6.4 µg and 9.2 µg (Samples 2-5, Table 2). The reaction proceeded for 12 h at 70° C. with no stirring and under the previously described conditions. The catalytic activity results obtained for Pd-chitin mat at different amount of catalysts in reactions mixture are summarized in Table 2 and Table 3.

The recyclability of the Pd-chitin catalyst was also tested, on the nanomat with Pd-loading of 9.2 µg (Sample 6, Table 2). After 2 reaction cycles, the conversion of starting material to products was 100% (translated into catalyst activity of 100%), and slightly lower conversion of 85% was observed after 3$^{rd}$ catalytic cycle.

TABLE 2

Reduction of Pd nanoparticles (NPs) on electrospun chitin mat using acidic conditions. Testing of catalytic activity (Suzuki reaction) at different catalyst load. Testing Pd-catalyst recyclability.

| | | | |
| --- | --- | --- | --- |
| Sample 1 | Reduction of Pd nanoparticles (NPs) on electrospun chitin mat using acidic conditions | Pd NPs were grown at acidic pH (pH 2) (in previous examples pH 10 was used) | Reduction successful |
| Sample 2 | Testing of catalytic activity (Suzuki reaction) | Catalytic activity was tested on Suzuki coupling for 0.96 µg of Palladium (Pd) | 29% conversion |

TABLE 2-continued

Reduction of Pd nanoparticles (NPs) on electrospun chitin mat using acidic conditions. Testing of catalytic activity (Suzuki reaction) at different catalyst load. Testing Pd-catalyst recyclability.

| Sample 3 | Testing of catalytic activity (Suzuki reaction) | Catalytic activity was tested on Suzuki coupling for 2.3 µg Palladium (Pd) | 62% conversion |
| Sample 4 | Testing of catalytic activity (Suzuki reaction) | Catalytic activity was tested on Suzuki coupling for 6.4 µg of Palladium (Pd) | 100% conversion |
| Sample 5 | Testing of catalytic activity (Suzuki reaction) | Catalytic activity was tested on Suzuki coupling for 9.2 µg of Palladium (Pd) | 100% conversion |
| Sample 6 | Testing Pd-catalyst recyclability | Recyclability was tested for catalyst at 9.2 µg Pd-loading | $1^{st}$ and $2^{nd}$ cycle recyclability: Complete 100% conversion was observed during $1^{st}$ and $2^{nd}$ catalytic cycles, slight decrease in activity (to ~85%) was observed on $3^{rd}$ catalytic cycle |

TABLE 3

Summary of results obtained for catalytic activity of Pd-chitin mats (Pd nanoparticles formed at pH 2) with different load of catalyst.

| Catalyst | Mass of Pd-chitin mat added, dry weight (mg) | Amount of Pd (µg) | Catalytic activity | |
|---|---|---|---|---|
| | | | Selectivity (%) | Yield (%) |
| Pd-chitin | 0.048 | 0.96 | 100 | 29 |
| | 0.114 | 2.3 | 100 | 62 |
| | 0.321 | 6.4 | 100 | 100 |
| | 0.465 | 9.2 | 100 | 100 |

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus, a combination of steps, elements, components, or constituents can be explicitly mentioned herein; however, all other combinations of steps, elements, components, and constituents are included, even though not explicitly stated.

What is claimed is:

1. A method of making a metal particle-chitin composite material, the method comprising:
    contacting an ionic liquid with chitin to effectively dissolve the chitin, thereby forming a mixture;
    contacting the mixture with a non-solvent by electrospinning the mixture into the non-solvent, thereby forming a chitin fiber in the non-solvent;
    collecting the chitin fiber from the non-solvent;
    deacetylating a surface of the collected chitin fiber, thereby forming a surface-deacetylated chitin fiber;
    contacting the surface-deacetylated chitin fiber with a metal salt, thereby forming an impregnated precursor composite material; and
    contacting the impregnated precursor composite material with a reducing agent, thereby reducing the metal salt to form a plurality of metal particles dispersed on the surface of the chitin fiber and thus forming the metal particle-chitin composite material.

2. The method of claim 1, wherein the plurality of metal particles have an average particle size of from 1 nm to 50 nm.

3. The method of claim 1, wherein the ionic liquid comprises a cation and an anion, wherein the cation is selected from the group consisting of:

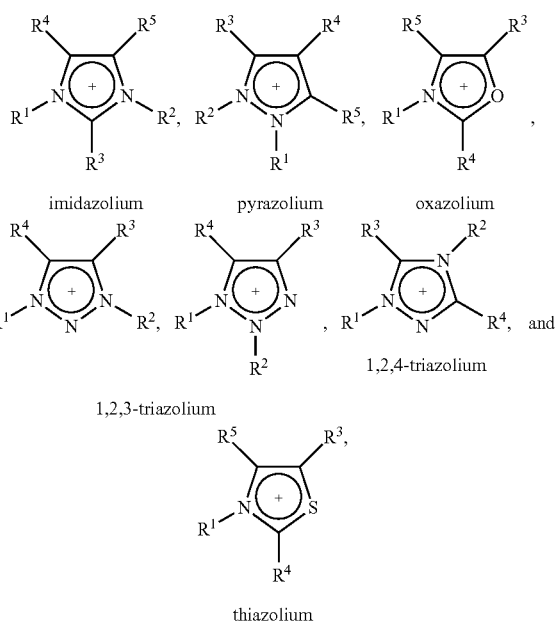

where each $R^1$ and $R^2$ is, independently, a substituted or unsubstituted linear, branched, or cyclic $C_1$-$C_6$ alkyl, or substituted or unsubstituted linear, branched, or cyclic $C_1$-$C_6$ alkoxy; and each $R^3$, $R^4$, and $R^5$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl; and wherein the anion is selected from the group consisting of $C_1$-$C_6$ carboxylate, halide, $CO_3^{2-}$; $NO_2^-$, $NO_3^-$, $SO_4^{2-}$, $CN^-$, $R^{10}CO_2$, $(R^{10}O)_2P(=O)O$, $(R^{10}O)S(=O)_2O$, and $(R_{10}O)C(=O)O$; and where $R^{10}$ is hydrogen; substituted or unsubstituted linear, branched, or cyclic alkyl;

substituted or unsubstituted linear, branched, or cyclic alkoxy; substituted or unsubstituted aryl; substituted or unsubstituted aryloxy; substituted or unsubstituted heterocyclic; or substituted or unsubstituted heteroaryl.

4. The method of claim 1, wherein the ionic liquid contains an imidazolium cation.

5. The method of claim 1, wherein the ionic liquid is a 1-alkyl-3-alkyl imidazolium $C_1$-$C_6$ carboxylate.

6. The method of claim 1, wherein the concentration of chitin in the mixture is from 0.1 wt % to 25 wt %.

7. The method of claim 1, wherein the non-solvent is water, a $C_1$-$C_4$ alcohol, ketone, or a mixture thereof.

8. The method of claim 1, further comprising separating at least a portion of the ionic liquid from the non-solvent, thereby forming a recycled ionic liquid, and wherein the recycled ionic liquid is used to contact the chitin.

9. The method of claim 1, wherein the chitin fiber is formed into a mat.

10. The method of claim 1, wherein deacetylating the surface of the collected chitin fiber comprises contacting the collected chitin fiber with a deacetylating agent, the deacetylating agent being selected from sodium hydroxide, potassium hydroxide, calcium hydroxide, lithium hydroxide, tripotassium phosphate, enzymes, and combinations thereof.

11. The method of claim 10, wherein the deacetylating agent comprises a solution having a concentration of the deacetylating agent in the solution of from 0.5 M to 12.5 M.

12. The method of claim 1, wherein the metal salt comprises a metal selected from the group consisting of Ag, Au, Pd, Pt, Cu, Fe, Ni, Co, and combinations thereof.

13. The method of claim 1, wherein contacting the surface-deacetylated chitin substrate with a metal salt comprises contacting the surface-deacetylated chitin substrate with a solution comprising the metal salt, and wherein the concentration of the metal salt in the solution is from 0.1 wt % to 40 wt %.

14. The method of claim 1, wherein the reducing agent comprises a borate buffer, borohydride, citrate, ascorbic acid, amino acid, surfactant, or a combination thereof.

15. The method of claim 1, wherein the plurality of metal particles comprise a metal selected from the group consisting of Ag, Au, Pd, Pt, Cu, Fe, Ni, Co, and combinations thereof.

16. The method of claim 1, wherein the metal particle-chitin composite material comprises the plurality of metal particles in an amount of from 0.1 wt % to 50 wt %.

17. An article of manufacture comprising the metal particle-chitin composite material made by the method of claim 1.

18. A catalyst comprising the metal particle-chitin composite material made by the method of claim 1.

19. A method of use of the catalyst of claim 18 to catalyze a coupling reaction.

20. The method of claim 19, wherein the coupling reaction comprises a Sonogashira coupling reaction or a Suzuki coupling reaction.

* * * * *